US010282161B2

(12) United States Patent
Randall et al.

(10) Patent No.: US 10,282,161 B2
(45) Date of Patent: May 7, 2019

(54) DIGITIZING ANALOG AUDIO DATA

(71) Applicant: Entotem Limited, Derby (GB)

(72) Inventors: Andrew Paul George Randall, Newbury (GB); Andrew James Maxim, Andover (GB); Alastair Bryers, Cholsey (GB); David Ian Belcher, Wantage (GB)

(73) Assignee: Entotem Limited, Derby (GB)

( * ) Notice: Subject to any disclaimer, the term of this patent is extended or adjusted under 35 U.S.C. 154(b) by 565 days.

(21) Appl. No.: 15/017,047

(22) Filed: Feb. 5, 2016

(65) Prior Publication Data

US 2016/0292268 A1 Oct. 6, 2016

(30) Foreign Application Priority Data

Apr. 2, 2015 (GB) .................................. 1505817.5

(51) Int. Cl.
*G06F 3/16* (2006.01)
*G11B 20/00* (2006.01)
*G11B 27/11* (2006.01)

(52) U.S. Cl.
CPC .............. *G06F 3/165* (2013.01); *G11B 20/00* (2013.01); *G11B 27/11* (2013.01)

(58) Field of Classification Search
CPC ....... G11B 20/02; G11B 27/031; G11B 20/00; G11B 27/11
USPC ........................................................ 707/916
See application file for complete search history.

(56) References Cited

U.S. PATENT DOCUMENTS

| 4,348,754 A  * | 9/1982 | Haynes  ................. | G11B 3/702 365/194 |
| 6,771,568 B2 * | 8/2004 | Hochendoner  ...... | G11B 19/025 369/30.06 |
| 7,161,887 B2 * | 1/2007 | Snow  ................ | G11B 20/1217 369/47.16 |
| 7,191,193 B2 * | 3/2007 | Ben-Yaacov  ..... | G06F 17/30026 360/32 |
| 7,756,915 B2 * | 7/2010 | Ben-Yaacov  ..... | G06F 17/30026 707/899 |
| 9,535,986 B2 * | 1/2017 | Butts  ....................... | G06F 16/60 |

(Continued)

OTHER PUBLICATIONS

The Audio Beat, Sound & Vision 2015, Hot Product, May 3, 2015, found at http://www.theaudiobeat.com/sound_vision2015/sv2015_entotem.htm, accessed Sep. 25, 2015.

(Continued)

*Primary Examiner* — Cheyne D Ly
(74) *Attorney, Agent, or Firm* — Richard M. Goldberg

(57) ABSTRACT

A commercial album of analog audio recordings, having multiple tracks, is identified. An analog recording of the album is played to produce an analog audio input signal. The audio output signal is digitally sampled to produce digitized segments. One or more track-titles are obtained (1902) from a remote audio finger-printing service for each digitized segment to provide track-titles. For each obtained track-title, each album-title is requested (1905) upon which the obtained track-title appears, to provide candidate albums. A score is generated (1905) for each provided candidate album based on the number of obtained track-titles that appear on a provided candidate album in the correct order. An album is identified by comparing (2209) these scores.

20 Claims, 24 Drawing Sheets

(56) References Cited

U.S. PATENT DOCUMENTS

| | | | | |
|---|---|---|---|---|
| 2002/0087303 A1* | 7/2002 | Sugiyama | ........ | G11B 20/00086 |
| | | | | 704/201 |
| 2003/0011680 A1* | 1/2003 | Tanaka | ................. | G11B 27/105 |
| | | | | 348/207.1 |
| 2004/0083199 A1* | 4/2004 | Govindugari | ..... | G06F 17/30303 |
| 2005/0117466 A1* | 6/2005 | Strachota | ................. | G11B 7/28 |
| | | | | 369/30.27 |
| 2005/0185927 A1* | 8/2005 | Kudou | ................. | G11B 27/105 |
| | | | | 386/240 |
| 2016/0092560 A1* | 3/2016 | Bates | ................... | G06F 16/686 |
| | | | | 707/728 |

OTHER PUBLICATIONS

UNLOCKPWD. Plato is a new multimedia system to store and play music and movies, 2015, found at http://www.unlockpwd.com/plato-is-a-new-multimedia-system-to-store-and-play-music-and-movies/, accessed Sep. 25, 2015.

hi-fi+, Plato by Entotem Recognised for Innovation at Sound and Vision Shown 2015, Feb. 27, 2015, found at http://www.hifiplus.com/articles/plato-by-entotem-recognised-for-innovation-at-sound-and-vision-show-2015/.

* cited by examiner

US 10,282,161 B2

DIGITIZING ANALOG AUDIO DATA

CROSS REFERENCE TO RELATED APPLICATIONS

This application claims priority from United Kingdom Patent Application number 1505817.5, filed Apr. 2, 2015, the entire disclosure of which is incorporated herein by reference in its entirety.

TECHNICAL FIELD

The present invention relates to an apparatus for digitally recording an analog audio signal derived from a commercial album. The present invention also relates to a method of identifying a commercial album of analog recordings.

BACKGROUND OF THE INVENTION

It is known to digitize analog audio data by a process of digital coding and then replay the digital data using a decoding process. Recently, a popular trend has been towards ripping digital audio data stored on compact discs to produce compressed audio files, often in the popular MP3 format. A further advantage of ripping digital data from a commercial compact disc is that discs of this type include unique codes allowing albums to be identified such that further information, including artwork and track listings etc, may be downloaded and stored with the recoded audio data.

Acoustic fingerprinting services are also available, where it is possible for analog audio to be sampled, a fingerprint identified and data returned identifying the particular track being played. Services of this type can also identify albums upon which the track occurs and provide further information identifying the other tracks that appear on the album.

Problems occur when a particular track occurs on many albums, therefore it is not possible to identify the specific album until all of the material has been considered. In some circumstances, not all of the material may be available and it may be preferable to identify album artwork at an early stage, even if this is later found to be incorrect and alternative artwork would have been preferable. Furthermore, services of this type are prone to errors and in high value equipment, erroneous responses could undermine the integrity of a high value system.

BRIEF SUMMARY OF THE INVENTION

According to a first aspect of the present invention, there is provided an apparatus for digitally recording an analog audio signal derived from a commercial album, in which said album has a plurality of tracks, comprising; an analog to digital converter for digitizing said analog audio signal; a digital storage device for storing a digital output from said digital to analog converter; and a processing device for analyzing said digital output to identify individual tracks and writing individual digitized tracks to said digital storage device, wherein said processing device is configured to: produce a plurality of digitized segments; obtain one or more track-titles from a remote audio finger-printing service; request an album-title for each album on which an obtained track appears to provide candidate albums; generate a score for each provided candidate album based on the number of obtained tracks that appear on each said candidate album; identify an album from said scores; and store said digital output as individual tracks with reference to said identified album.

In an embodiment, the commercial album is a vinyl record and said analog signal is generated by a phonographic cartridge.

According to a second aspect for the present invention, there is provided a method of identifying a commercial album of analog recordings, in which and album has a plurality of recorded tracks, comprising the steps of: playing an analog recording of said album to produce an analog input signal: digitally sampling said audio input signal to produce a plurality of digitized segments; obtaining one or more track-titles from a remote audio fingerprinting service for each said digitized segment, giving a plurality of obtained track-titles; for each said obtained track-title, requesting each album title upon which the obtained track-title appears, to provide candidate albums; generating a score for each provided candidate album based on the number of obtained track-titles that appear on a provided candidate album in the correct order; and identifying an album by comparing said scores.

In an embodiment, an integrated system receives an analog signal from a phonograph, produces digital segments and performs the detailed steps to identify the album. However, in alternative embodiments, these initial steps could be performed on separate systems. Thus a phonograph could digitize the audio input signal to generate a digital signal. This could be recorded to a single file, from which the digitized segments are subsequently produced.

In an alternative embodiment, digitized samples could be processed by an application running on a different system, such as a computer or a mobile device, such as a cellular telephone. The application would analyse the samples, as set out by the method, in order to identify a particular album.

DESCRIPTION OF THE BEST MODE FOR CARRYING OUT THE INVENTION

FIG. 1

Figure 1:
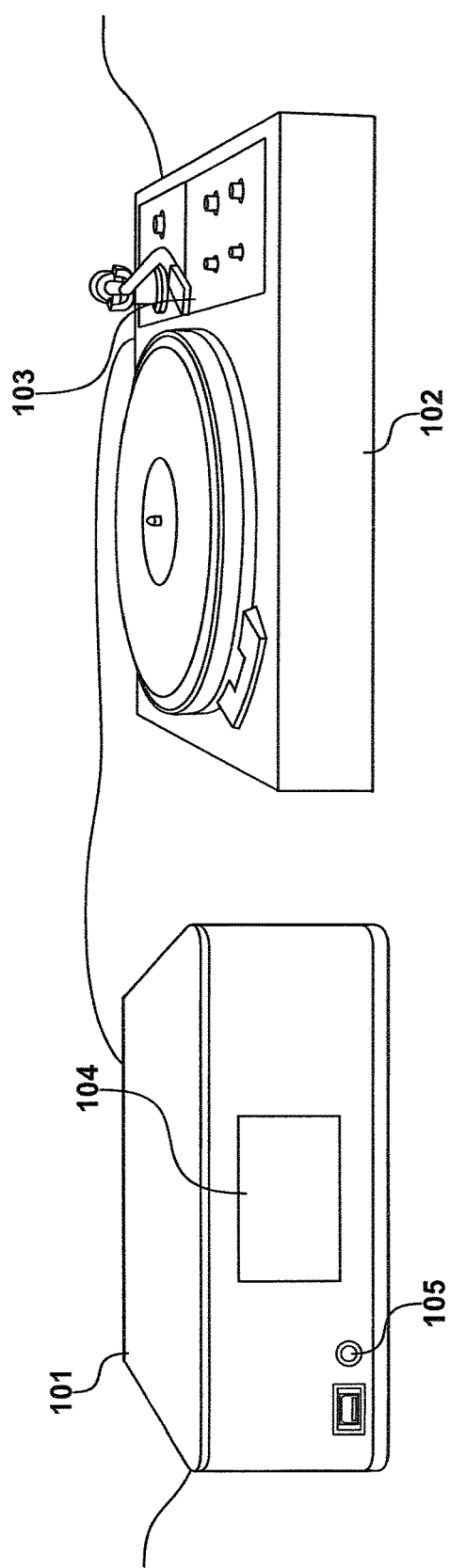
FIG. 1 shows an apparatus for digitizing an analog audio signal.

An apparatus 101 for digitizing an analog audio signal is shown in FIG. 1. The apparatus is capable of receiving analog audio signals from many sources (and for receiving digital input signals) with circuitry provided specifically for receiving an analog audio signal from a record deck or phonograph 102.

The phonograph 102 includes an input transducer 103 for producing an analog input audio signal. In an embodiment, a cartridge 103 is selected from a cartridge type including a moving magnet cartridge and a moving coil cartridge. The apparatus 101 includes a capacitor configured to be selectively brought into circuit upon activation of a first relay by a first control signal. In addition, a variable gain amplifier is configured to have gain adjustments made in response to a second control signal. The first control signal and the second control signal may be received from a control processor and the control processor may receive input commands via a touch sensitive graphical user interface displayed on a display screen 104.

The apparatus 101 could become the centre of a home entertainment system, containing a preamplifier, a power amplifier, a power supply and a microprocessor with a disc drive. External sources may be connected to the preamplifier, including a record deck as shown in FIG. 1, plus a compact disc player and a tape player etc. These are connected via appropriate digital or analog inputs.

FIG. 2

Figure 2:
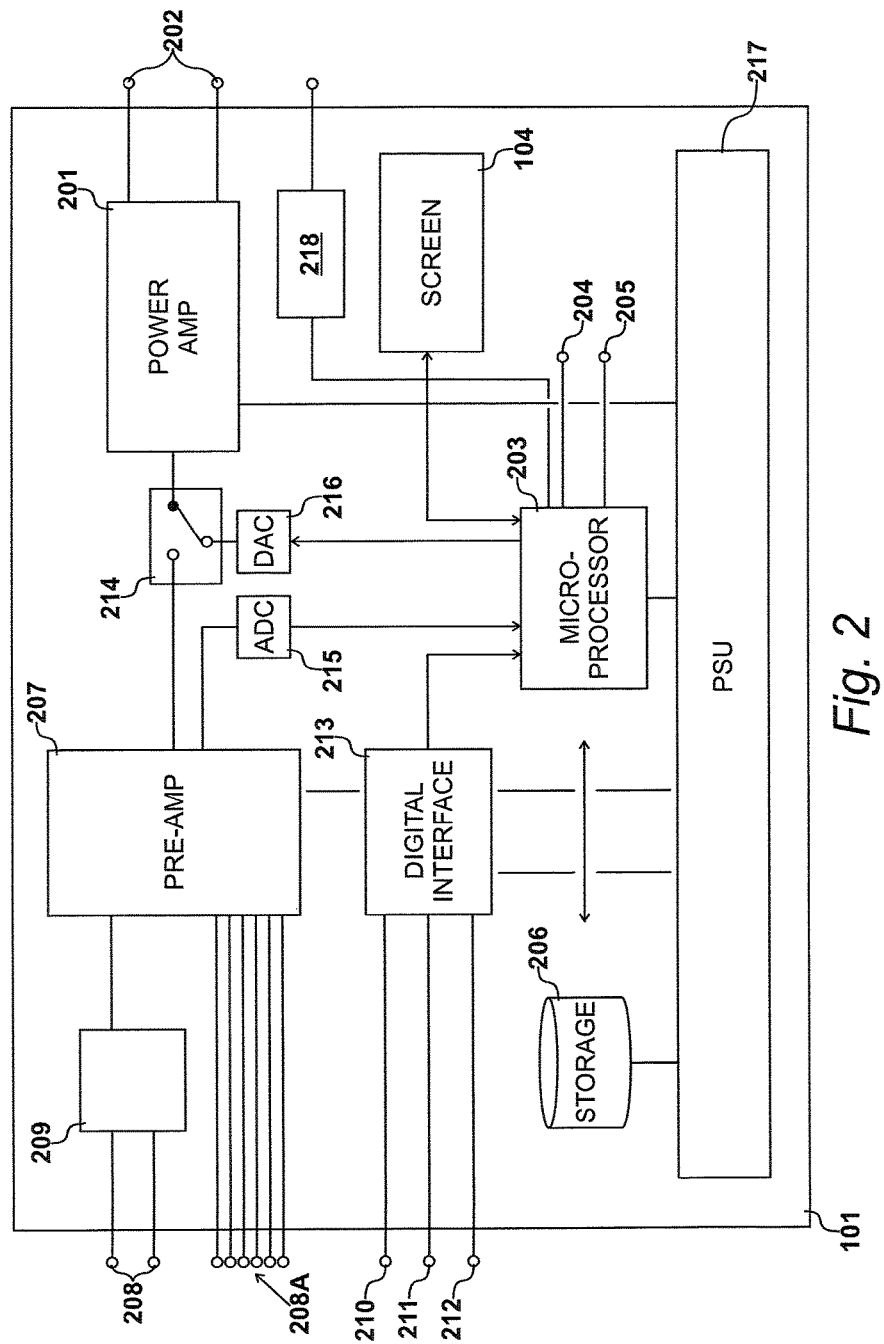
FIG. 2 shows a schematic representation of the apparatus of FIG. 1.
Figure 3:
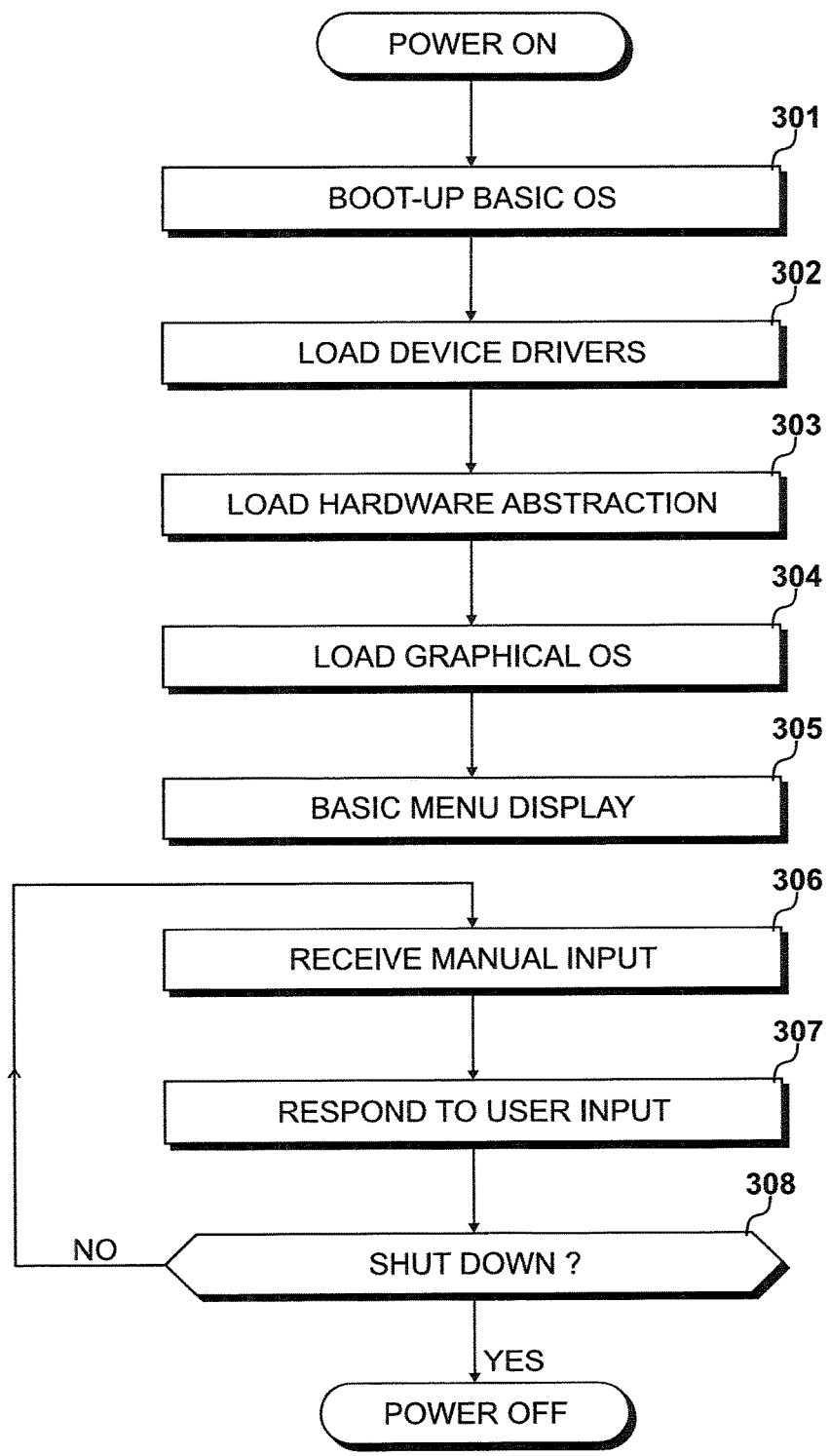
FIG. 3 shows operations performed by the processor identified in FIG. 2.

A schematic representation of the apparatus 101 is shown in FIG. 2. A power amplifier 201 provides outputs 202 for loudspeakers. A microprocessor 203 provides computational operations and receives input commands via the touch screen 104. In an embodiment, the touch screen 104 is supported by the android operating system and operations performed by the apparatus are controlled by an android application. The microprocessor 203 also has network interfaces, including a USB connection 204; and an HDMI output 205, allowing the apparatus to be connected to a conventional television monitor.

A disc storage device 206 may be implemented using mechanical disc technology or as a solid state device. In addition to storing program files and configuration data etc, storage device 206 is also configured to store audio files and video files that can be played locally or streamed to other network connected devices. These network devices could include smart televisions and wireless loudspeakers. The system has sufficient processing capability to allow audio and video to be played locally while at the same time allowing audio and video to be streamed to other devices.

The apparatus also has provision for performing format conversion. In an embodiment, material is held locally at very high definition, typically requiring a sample rate of one hundred and ninety two kilo-hertz (192 kHz) with a bit depth of twenty four (24) bits. Down sampling and depth reduction are often included as part of a format conversion process, in order to stream to devices having lower capabilities.

A preamplifier 207 receives analog inputs. In this example, a first analog input 208 is received from phonographic cartridge 103 and supplied to the preamplifier 207 via a phono circuit 209.

Additional analog inputs 208A, possibly for connection to a tape player, mini disc player and a receiver supply analog signals directly to the preamplifier 207. Digital inputs 210, 211 and 212 provide digital signals directly to a digital interface 213 that interfaces with the microprocessor 203. A relay 214 allows an analog output from the preamplifier 207 to be supplied directly to the power amplifier 201.

An output from the preamplifier 207 is also supplied to an analog to digital converter 215 that digitizes the analog signal at a sampling rate of one hundred and ninety two kilo-hertz (192 kHz), twenty four (24) bit PCM. The digitized output from the analog to digital converter 215 is supplied to the microprocessor 203.

Digital audio output signals from the microprocessor 203 are supplied to a digital to analog converter 216 and the output from converter 216 may be supplied to the power amplifier 201 via a relay 214. Relay 214 is controlled by a control signal from the microprocessor 203 generated in response to manual input received via the touch screen 104.

Power is received from a power supply unit 217 and power can be selectively supplied to individual sub-assembles under the control of the microprocessor 203. This facilitates soft power up and soft power down in response to activation of a power button 105. The device also includes temperature detectors such that operations may be performed, including a power down operation, in response to the detection of overheating conditions.

When playing commercial albums, from storage 206, a digital source (via inputs 210 to 212) or an analog source (via inputs 208 or 209) procedures are implemented to identify the specific album being played, so that related album artwork may be displayed on the display screen 104.

FIG. 3

Upon activating the apparatus, a basic operating system, derived from Linux in an embodiment, boots up at step 301. At step 302 device drivers, including drivers for the screen 104, are loaded and at step 303 a hardware abstraction layer is loaded.

The hardware abstraction layer is required because conventional operating systems of the type deployed would usually control volume, for example, using digital multipliers; such that all operations of this type are performed within the digital domain. In the present embodiment, analog signal paths are maintained and the control of volume and balance etc. is achieved using physical devices. Consequently, interfaces are required in order to allow the software control to effect control upon these physical devices.

At step 304 a graphical operating system, such as android, is loaded resulting in a basic menu being displayed at step 305. The provision of a conventional initial graphical interface in this way allows the system to make use of many other available applications, such as Internet radio, with the specific application of the system itself being selected as one of these applications. Thus, an android APK provides appropriate graphical interfaces for controlling the system and allows the microprocessor 203 to communicate with the rest of the system. Furthermore, upgrades to the android core have been made in order to support 24 bit audio.

Thus, having established the android environment, the touch screen 104 receives manual input at step 306. The application is then responsive to user input at step 307; calling specific functions, examples of which are described with reference to FIGS. 4 to 8.

A question is asked at step 308 as to whether a shutdown request has been made, such that the system will shut down or continue to be responsive to further manual input at step 306.

FIG. 4

Figure 4:
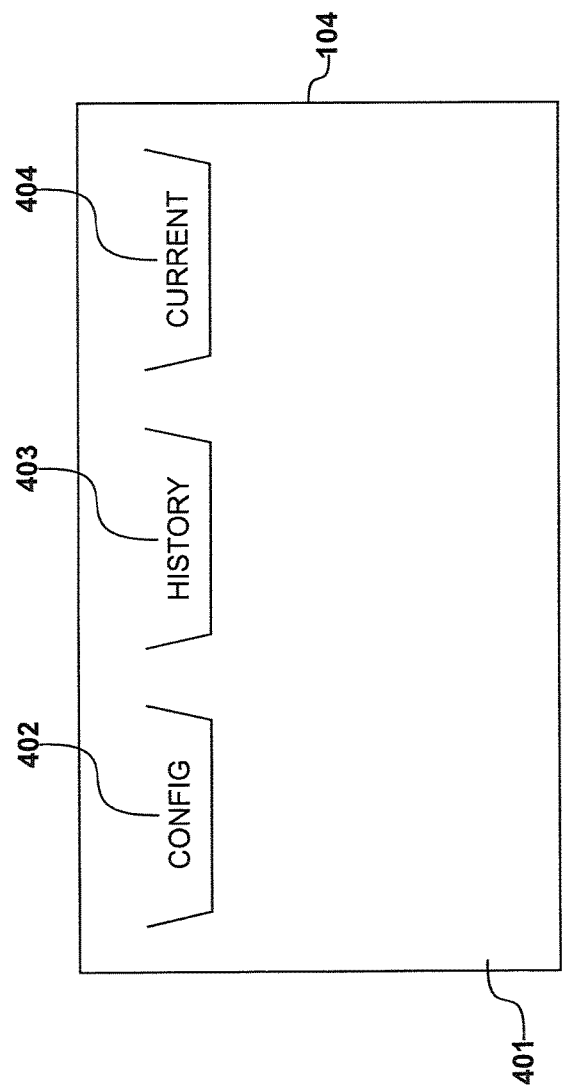
FIG. 4 shows a first graphical user interface.

In response to receiving manual input (at step 306) the application of the embodiment is called and the touch screen 104 presents a graphical user interface 401, as illustrated in FIG. 4. The graphical user interface 401 shows a first tab 402 for configuration, a second tab 403 identifying a history and a third tab 404 for identifying what the system is currently doing. Selection of the history tab 403 identifies what has been played and facilitates the creation of playlists.

FIG. 5

Figure 5:
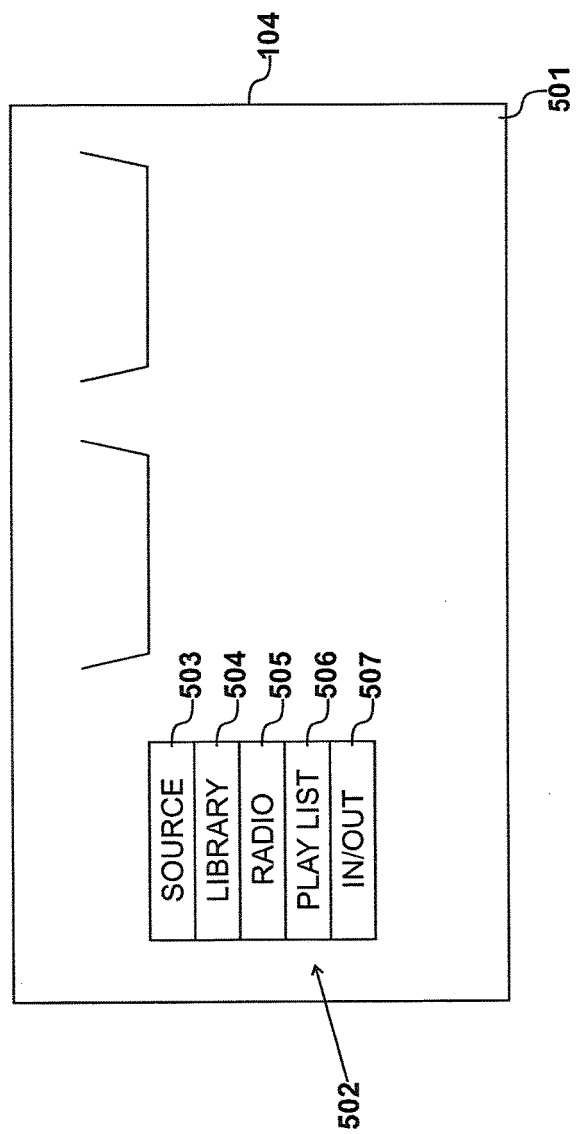
FIG. 5 shows a second graphical user interface, selected after an interaction with the first graphical user interface of FIG. 4.

The reception of manual input in response to activation of the configuration tab 402, results in the presentation of a graphical user interface 501 of the type shown in FIG. 5. In interface 501, a set of drawers 502 are presented facilitating the manual selection of particular configuration attributes. These include source related attributes, selected by the activation of region 503. Similarly, regions 504, 505, 506 and 507 provide for library configuration, radio configuration, playlist configuration, data input configuration and data input/output configuration respectively.

In an alternative embodiment, the menu drawers may be part of a main application feature control, with each drawer presenting its own variant of the view shown in FIG. 4, consisting of the configuration, history and current tab views. In this alternative embodiment, the menu drawers are always selectable from a control on the main application page.

Having selected a source control drawer, further selection/configuration options are available on the configuration tab 402.

FIG. 6

Figure 6:
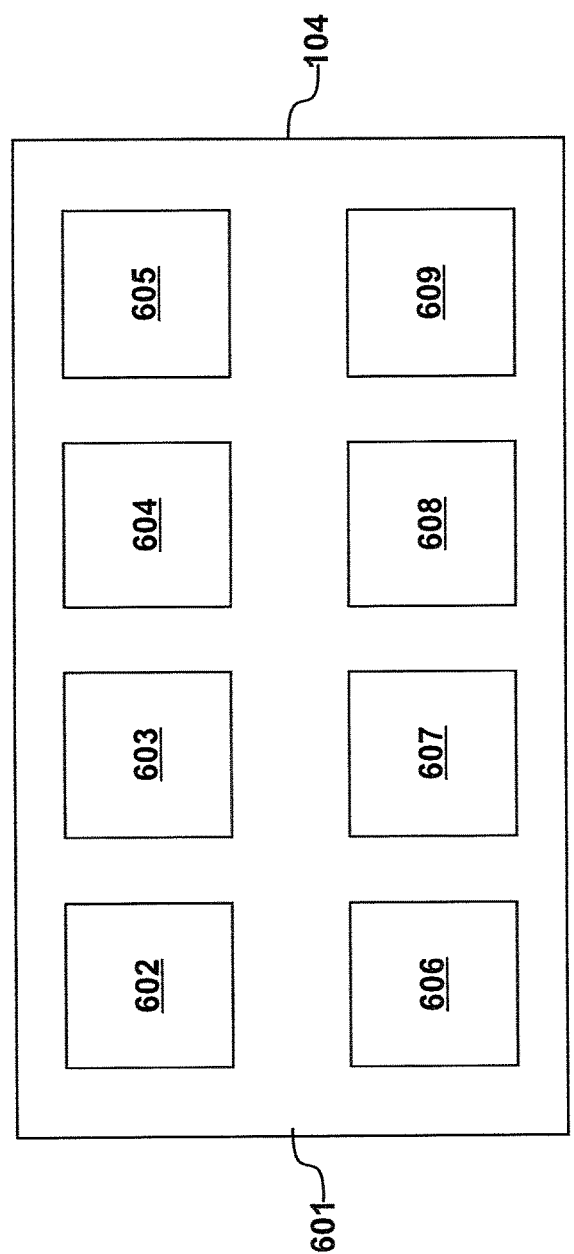
FIG. 6 shows a third graphical user interface, produced following manual interaction with the graphical interface of FIG. 5.

The reception of manual input in response to the activation of source region 503 results in the display of a graphical user interface 601 of the type shown in FIG. 6. In an embodiment, the apparatus 101 includes a total of eight individual inputs, four of which may be analog inputs and the remaining four may be digital inputs. Graphical user interface 601 provides a specific region 602, 603, 604 and 605 for each individual analog input. In addition, similar regions 606, 607, 608 and 609 are provided for the identification of digital inputs.

Each region may be assigned to any specific input. The region may be given a name, effectively naming the input, and a picture or graphical representation may be included within each of the regions 602 to 609, thereby clearly identifying the nature of the equipment providing the input signal. In this example, region 602 has been identified for representing the turntable input, from the turntable illustrated in FIG. 1.

In an embodiment, the reception of a conventional finger press, of relatively short duration, allows that particular input source to be selected, thereby making the input operational. Furthermore, in an embodiment, a longer finger press (a long press) is identified at step 306 as such, allowing the system to take alternative action. Thus, in this embodiment, in response to a long press upon region 602, it is possible to enter a configuration mode for that particular input.

FIG. 7

Figure 7:
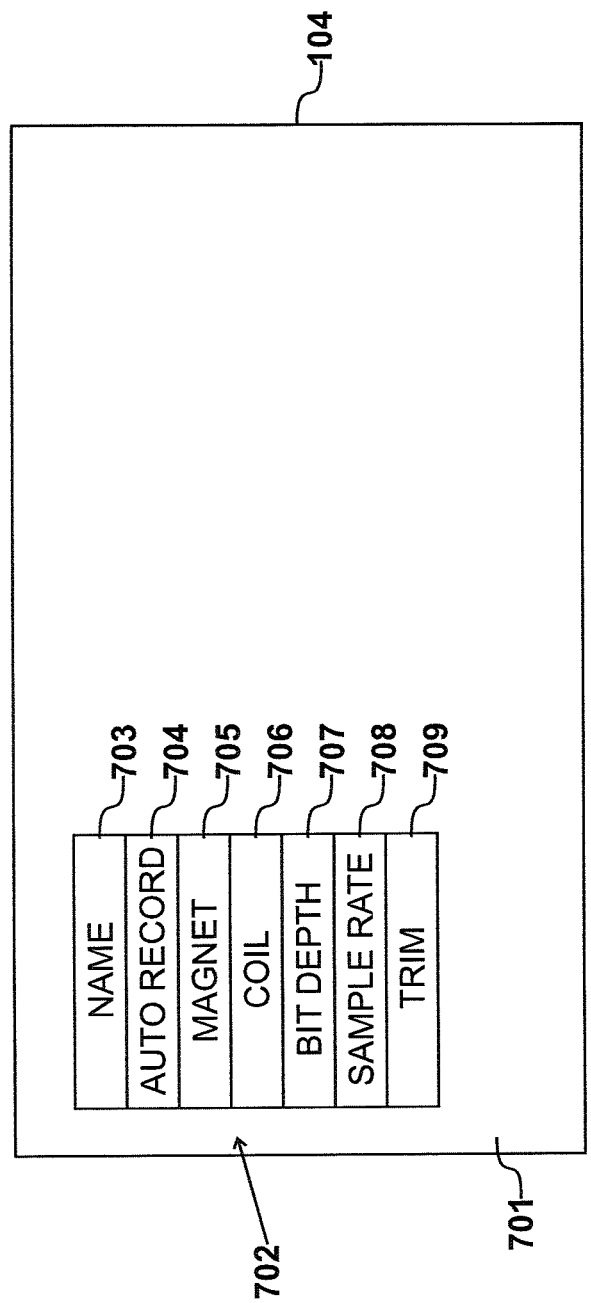
FIG. 7 shows a fourth graphical user interface, produced following interaction with the interface of FIG. 6.

In response to the reception of manual input, following a long press upon region 602, a graphical user interface 701 of the type illustrated in FIG. 7 is presented on the touch screen 104. A further drawer 702 is displayed presenting regions comprising region 703 for name configuration, region 704 for auto record selection, region 705 for moving magnet cartridge selection, region 706 for moving coil cartridge selection, region 707 for selecting bit depth, region 708 for selecting sample rate and region 709 for selecting a trimming operation.

Selection of the name region presents a graphical user interface within which it is possible to use a keyboard for identifying a specific name.

Selection of the auto record function provides for the auto recording of input data whenever the particular input is selected. Thus, for example, upon pressing the auto record region 704, the region becomes highlighted or effects a change of colour. The auto record feature is now active, such that whenever the input is selected, continual recording to the internal storage device 206 is initiated. Thus, in this way, any record played by the record deck 103 will result in audio data being recorded for subsequent manipulation and analysis. Alternatively, if the auto record function is not activated, recording of this type will not take place automatically and if recording is required, further intervention will be required in order to select the record function.

Drawer 702 allows the moving magnet region 705 to be activated or the moving coil region 706 to be activated. In an embodiment, the activation of one of these cartridge types will deactivate the other cartridge type. Again, a long press, identified as an alternative manual input at step 306, provides for the display of a configuration graphical user interface.

FIG. 8

Figure 8:
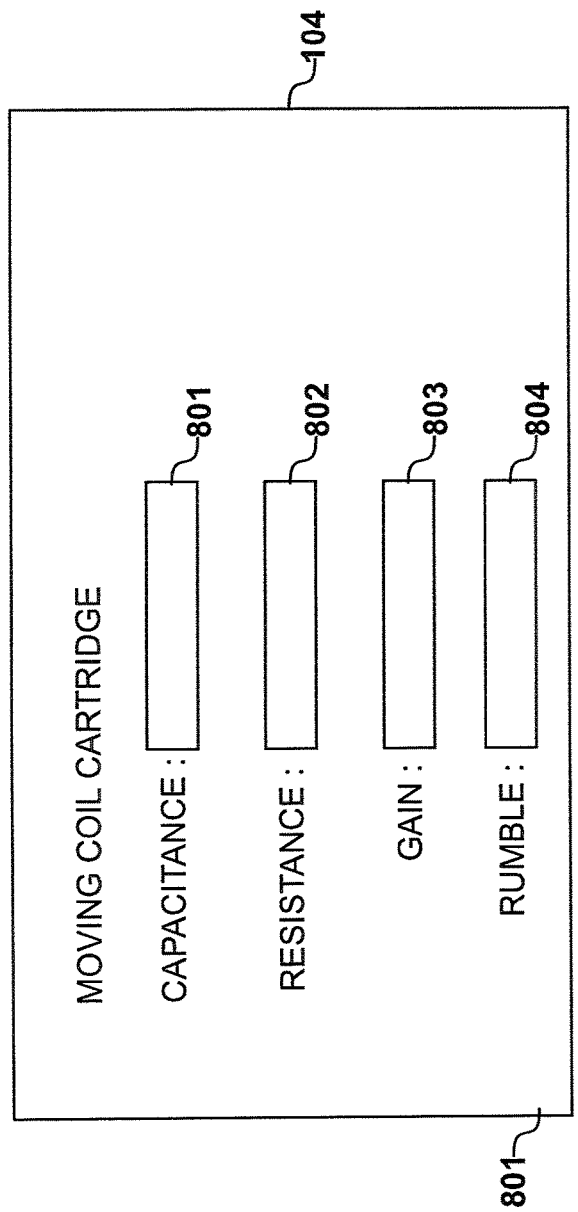
FIG. 8 shows a fifth graphical user interface, produced following interaction with the interface of FIG. 7.

A long press within region 706 results in the presentation of graphical user interface 801 as shown in FIG. 8. This defines a region 801 for specifying an input capacitance, a region 802 for specifying an input resistance (collectively referred to as the input impedance) and a third region 803 for specifying a level of gain prior to the preamplifier stage. A fourth region 804 also allows a rumble filter to be activated.

In an embodiment, it is possible for a specific value of capacitance and resistance to be typed into regions 801 and 802 respectively. However, in an embodiment, preconfigured values are included and values for capacitance, for example, cycle in response to repeated presses with region 801. Thus, in a similar way, resistance values may be specified within region 802, gain values may be selected within region 803 and the rumble filter may be activated or deactivated by interacting with region 804.

FIG. 9

An activation of region 709 results in the display of a graphical user interface 901 on display screen 104 to facilitate the trimming of the input signal. Often, cartridges are not level balanced and it is necessary to apply a trim in order to achieve a balanced stereo input signal. In an embodiment, the trim is also achieved under microprocessor control, therefore when a trim is applied it is specific to that particular input and is not applied to the remaining inputs.

Figure 9:
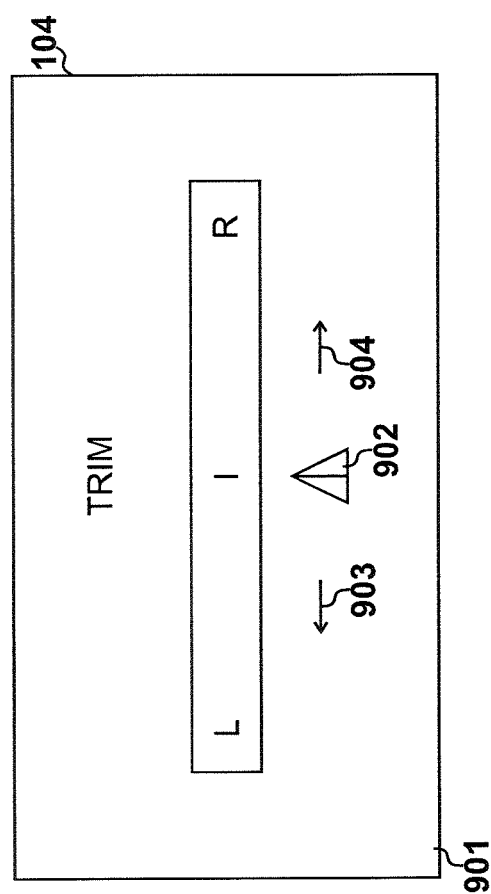
FIG. 9 shows a sixth graphical user interface, also produced following interaction with the interface of FIG. 7.

As shown in FIG. 9, the trim operation is achieved by manually interacting with a slider icon 902, such that the balance may be moved to the left channel by sliding icon 902 in the direction of arrow 903 or, alternatively, emphasis may be placed on the right channel by a similar manual operation in the direction of arrow 904.

In an alternative embodiment, the menus of FIGS. 7, 8 and 9 may be combined into a unified configuration page. A long press on one of the input port icons may activate a screen layout as follows, with anything within angled brackets < > being configurable by repeated presses applied to the appropriate area.

| | |
|---|---|
| Generic Controls | <image> |
| | <name> |
| | <volume trim> |
| | <balance trim> |
| Phono Controls | <coil/magnet> |
| | <gain> |
| | <input capacitance> |
| | <rumble filter> |
| Record Controls | <default action> |
| | <bit depth> |
| | <sample rate> |

For the other three analog inputs, the Phono Controls would not be present.

FIG. 10

Figure 10:
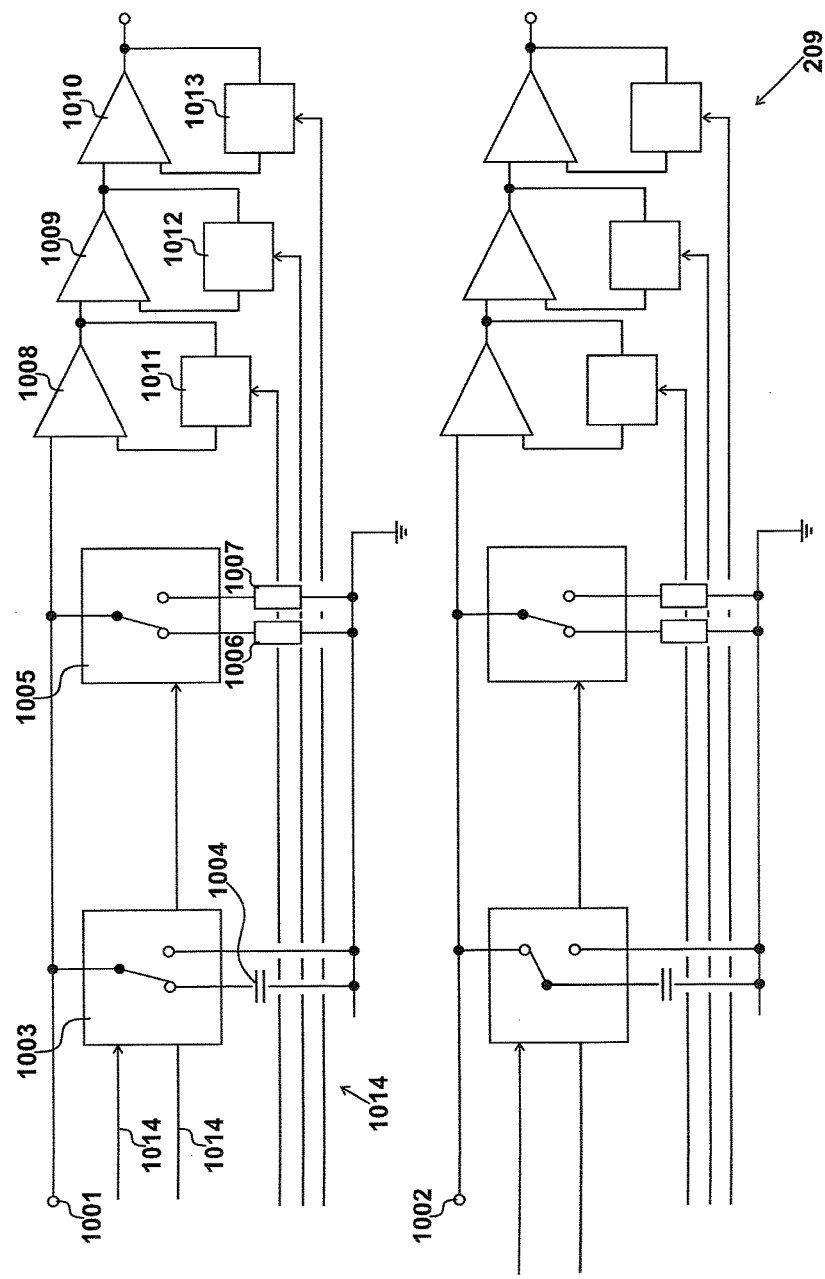
FIG. 10 details the phono circuit identified in FIG. 2.

A phono input stage circuit is illustrated in FIG. 10 that, in an embodiment, is a daughter card that supplies an input to the preamplifier; collectively forming part of the apparatus for digitizing an analog audio signal. In FIG. 10, a first input 1001 is shown for the left channel and a second input 1002 is shown for the right channel; the channels being substantially similar.

Input 1001 is applied to a relay 1003 providing a switchable capacitance by means of a capacitor 1004 of one hundred picofarad (100 pF). Moving magnet cartridges are specified as expecting an input impedance of forty-seven kilo-ohm and a low capacitance of either one hundred picofarad (100 pF) or two hundred picofarad (200 pF). Thus, a capacitance of one hundred picofarad (100 pF) is present and a further one hundred picofarad can be added if required. Thus, having selected the moving coil cartridge interface as shown in FIG. 8, activation of region 801 displays a capacitance of one hundred picofarad (100 pF) or two hundred picofarad (200 pF).

A second relay 1005 allows the input resistance to be switchable. Options appear in region 802 depending upon the type of cartridge that has been selected. For a moving magnet cartridge, the input resistance is forty-seven kilo-ohm (47 k). For a moving coil cartridge, the system offers either one hundred ohm, by switching resistor 1006 into circuit or two hundred ohm by switching resistor 1007 into circuit.

The input signal is supplied to a first amplification stage 1008 followed by a mid-amplification stage 1009 and a filtering stage 1010. The first amplification stage 1008 allows a selection of low gain of thirty-six point four decibel (36.4 dB) or a high gain of fifty-three decibel (53 dB). The mid-gain stage 1009 provides for multiplication by unity or by one point five. Filtering stage 1010 is a high pass filter, removing low frequencies created by the mechanical nature of the record playback process and usually referred to as rumble.

Characteristics of stages 1008 to 1010 are controlled by respective relay devices 1011, 1012 and 1013. All relay devices are controlled by the microprocessor 203 by control lines 1014. Many selectable stages of gain are required to provide an optimum input level to the digital to analog convertor 216. It is also appreciated that for moving magnet cartridges the possible output levels fall within a wide range.

FIG. 11

Figure 11:
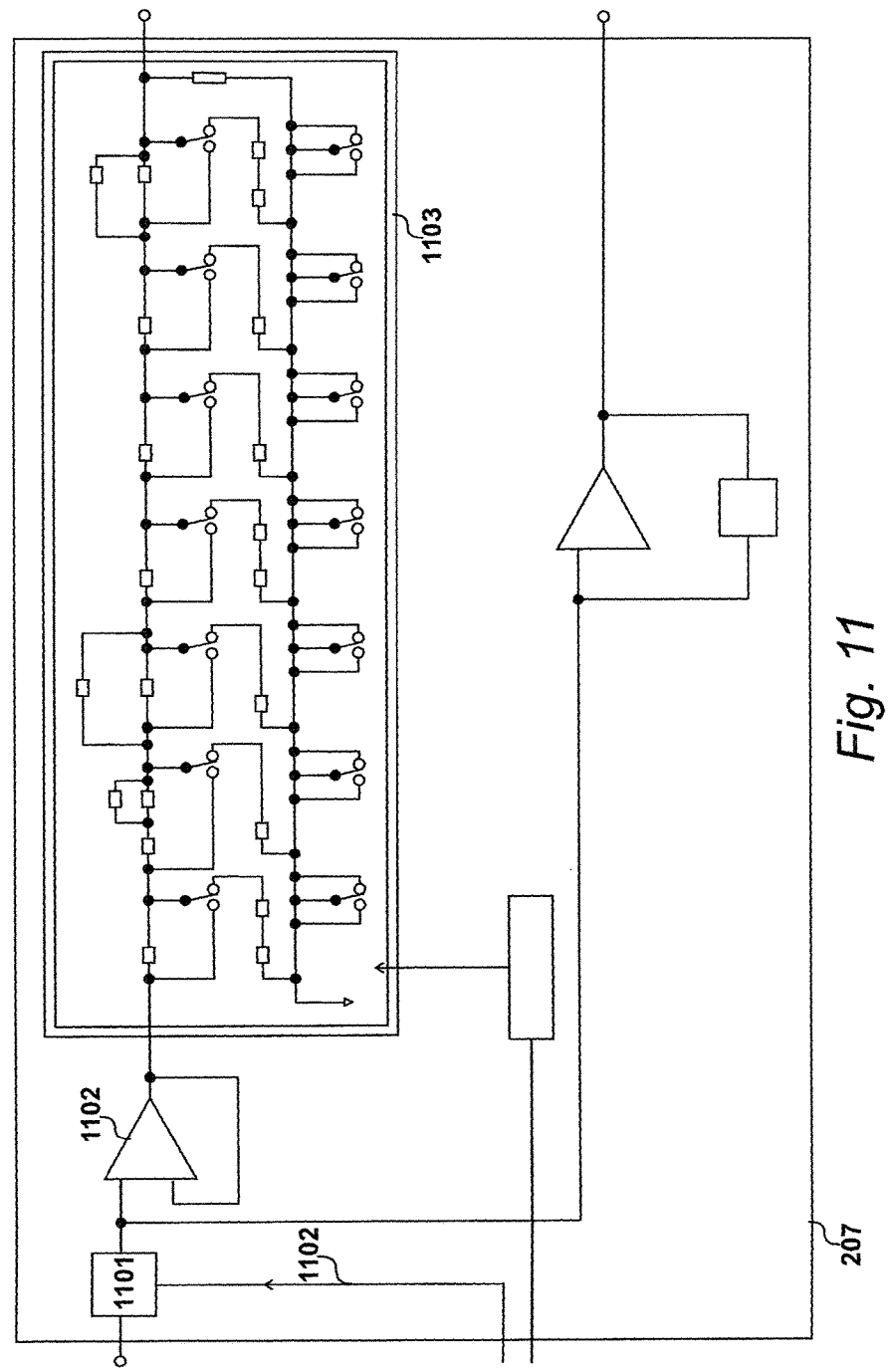
FIG. 11 shows the preamplifier stage identified in FIG. 2.

Preamplifier stage 207 is illustrated in FIG. 11. The preamplifier includes a programmable gate array 1101 that, in response to a control signal on line 1102 from the microprocessor 203, provides a gain of minus six decibel (−6 dB), zero, plus six decibel (+6 dB) or plus twelve decibel (+12 dB). In this way, many options are available for adjusting gain before a signal is supplied to the anolog to digital converter 215 and the power amplifier 201.

A particular gain value is selected via interface 803 and the microprocessor 203 is configured to make appropriate adjustments to relays in order to achieve this level of gain. Thus, options for achieving the required level of gain may be significantly more sophisticated than what would be possible by direct manual intervention. In an embodiment for example, eight different elements may be adjusted in order to provide a wide range of available gain levels.

Is should also be appreciated that by selecting a particular type of cartridge, options for making further refinements are themselves selected, such that the possible range of gain values will alter.

An output from the gate array 1101 is provided to the power amplifier 201 via an input buffer 1102 and a chain or ladder 1103 of relays and resistors for volume control. Volume control is provided via a graphical user interface displayed on display device 104 and in response to manual operation of this interface, the switching of the relays contained within chain 1103 is performed. Thus, volume control is not achieved digitally within the microprocessor 203 and it is not achieved using a volume potentiometer.

In FIG. 11, a single channel is shown and it should be appreciated that this circuitry is repeated for the other channel. In this way, the relay chain 1103 provides volume control and balance control. The volume may be adjusted in response to manual interaction, as previously described and volume control may also be made in response to alternative inputs. Thus, it can be appreciated that the abstraction layer is required within the operating system because these physical volume devices are being physically moved and volume adjustment is not achieved by adjusting a multiplying operation within the microprocessor 203. In an embodiment, the device is capable of moving through more steps than a typical android device in order to achieve the level of control that would be expected within high fidelity equipment of this type.

It is also appreciated that the system is likely to be connected to high value loudspeakers and, as is known in the art, loudspeakers of this type may be damaged by a sudden input spike and should therefore be protected if their integrity is to be maintained. During the switching of characteristics of the input stage, when making adjustments to the gain for example, it is likely that undesirable transients will be created which would result in the generation of noisy pops and crackles at the loudspeakers; unpleasant and potentially damaging. Thus, in order to mitigate the effects of these changes, in an embodiment, the volume is reduced prior to a change taking place. Thus, in response to a manual interaction in order to, say, change the gain of the preamplifier stage, the volume will firstly be reduced, a change to the gain characteristics will be made, by the switching of appropriate components and the volume will then be increased back to a previous level. Such an operation may take place in typically one-hundred milli-seconds (100 ms) and can hardly be perceived by a user.

Thus, microprocessor control of the volume components can be instigated for reasons other than providing the user with a requested level of volume. Furthermore, the volume control elements may be adjusted in response to signals generated elsewhere, without requiring the intervention of the microprocessor 203.

The apparatus facilitates the digitizing of an analog audio signal received from an input transducer, such as a phonographic cartridge. The input stage has an adjustable input impedance, due to the presence of capacitor 1004 and resistors 1006 and 1007. In addition, there are a plurality of adjustable gain stages, provided by amplifiers 1008, 1009 and gate array 1101.

An analog to digital convertor 215 digitizes the output from the amplification stages. A control processor 203 presents a graphical user interface to a user from which transducer related data is manually selected via interface 801. The control processor 203 includes program instructions to determine appropriate adjustments to the adjustable input impedance and the adjustable gain stages in response to the manually selected data. These adjustments are then implemented by the activation of relay devices 1003, 1005, 1011, 1012 and 1013 in response to signals received from the control processor 203.

FIG. 12

Figure 12:
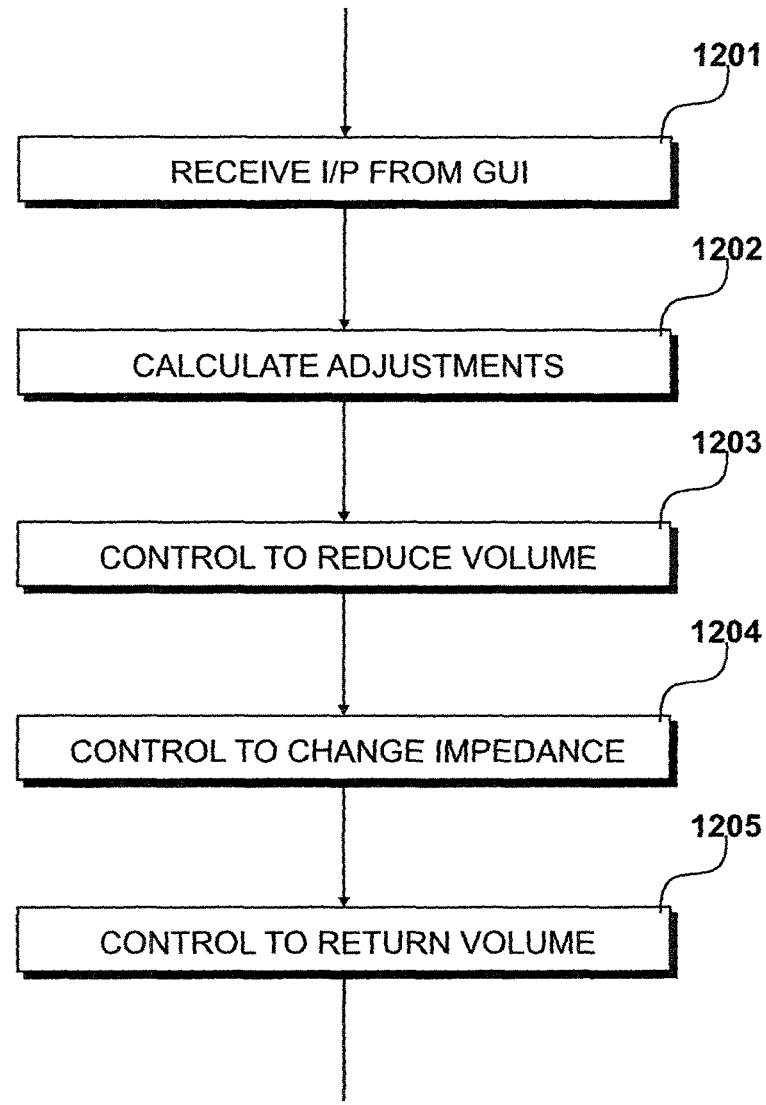
FIG. 12 illustrates operations performed by the microprocessor identified in FIG. 2.

Operations performed by the microprocessor 203 in an embodiment of the present invention are illustrated in FIG. 12. At step 1201 an analog signal is received from input transducer 103 via an input stage 209 having adjustable impedance 1004, 1006, 1007. The analog signal is amplified via a plurality of adjustable gain stages 1008, 1009 to produce an amplified anolog signal. The amplified anolog signal is digitized via an anolog to digital converter 215. Controls are presented for adjusting the impedance and adjusting gain via a graphical user interface 801. Input controls are processed from the graphical interface to produce control signals and these control signals are applied to relay devices 1003, 1005 to deploy circuit elements for adjusting the impedance and the gain.

Thus, at step 1202 adjustments are calculated such that the microprocessor 203 is now in a position to effect the changes that are required.

At step 1203 control signals are supplied to the relay chain 1103 to reduce output volume. The required changes are then implemented at step 1204 and the original volume level is returned at step 1205.

FIG. 13

Figure 13:
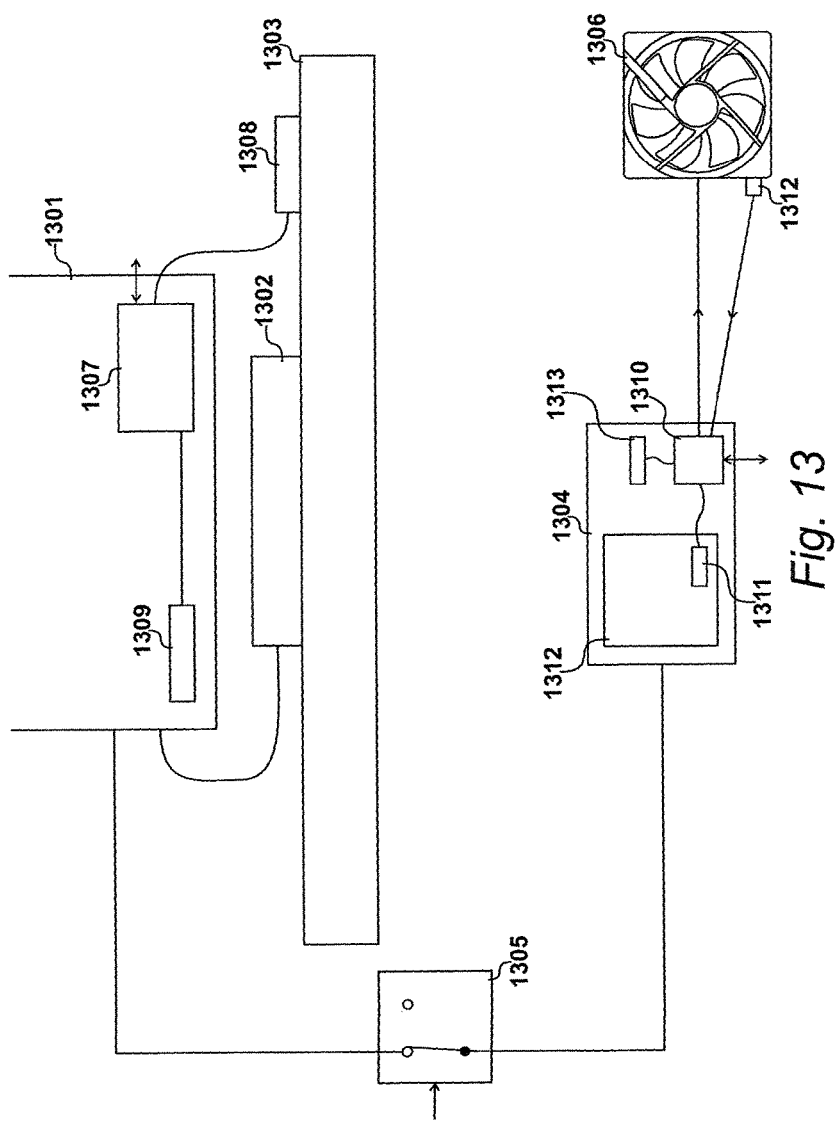
FIG. 13 shows a printed circuit board for the power amplifier.

A printed circuit board 1301 for the power amplifier 201 is illustrated in FIG. 13. In an embodiment, the power amplifier 201 is a class B amplifier biased so there is very little overlap between positive and negative half cycles. In an embodiment, heat generating power transistors, including transistor 1302, have a heat sink that is bonded to a bottom plate 1303 of the outer casing of the apparatus 101. Consequently, at normal operating temperatures, it is not necessary to use forced air cooling.

A power supply circuit 1304 supplies power to the power amplifier circuit 1301, via a relay 1305 controlled by the microprocessor 203. The power supply circuit 1304 includes environmental monitoring control and safety devices, such that it is in a position to take action should the system become too hot. This includes a power shutdown of the power amplifier via relay 1305 and the activation of a cooling fan 1306. In addition, the microprocessor 203 is also in a position to take more sophisticated action should an initial detection be made to the effect that the amplifier is starting to run at a temperature above what is considered to be a normal operational temperature.

In the apparatus for amplifying an audio signal, an amplifier has a plurality of input ports and an output port. In an embodiment, there are four digital input ports; and four analog input ports provide inputs to a preamplifier. The preamplifier provides an input to the power amplifier and from the power amplifier outputs are available for the left channel and the right channel.

The microprocessor 203 provides a control processor that is configured to present a graphical user interface to a user to allow a user to manually select an input port and control an output volume. The preamplifier 207 includes an attenuator/volume circuit controlled by a control signal. Temperature sensing devices provide high temperature data to the control processor. The control processor is configured to reduce output volume if the temperature data indicates that the temperature of the apparatus has exceeded a predetermined level.

Temperature sensing is provided for the power amplifier 201 and the power supply circuit 1304. A control device, in the form of a safety microcontroller 1307, is included on the power amplifier circuit board 1301. A first heat sensor 1308 is bonded to the heat sink 1303 and a second temperature sensor 1309 is mounted on circuit board 1301. If either sensor identifies a temperature above seventy degrees Celsius (70° C.), the microprocessor 203 will generate an output signal to gate array 1101 in order to reduce the output volume by twelve decibel (12 dB). As an alternative or in addition, control could be supplied to the volume adjustment ladder 1103.

If the temperature, as determined by control device 1307, continues to rise to a level above eighty degree Celsius (80°), relay 1305 will be activated resulting in power to the power amplifier being switched off. The power supply circuit 1304 also includes a safety microcontroller 1310 that receives temperature data from a temperature device 1311 mounted on a power supply circuit board 1312. In addition, a temperature signal is also received from a second detector 1313 arranged to measure the temperature of the ambient air around the power supply circuit.

If microcontroller 1310 receives data to indicate temperature exceeding a predetermined level, such as fifty degrees Celsius (50° C.), the microcontroller 1310 will activate a cooling fan 1306 in order to cool the system, with the aim of maintaining functionality while ensuring that the system does not overheat. Cooling fan activation on the power supply unit occurs at fifty degrees Celsius (50° C.) because this component does not dissipate as much heat as the power amplifier. Cooling fan 1306 also includes a tachometer 1312 configured to provide confirmation back to microcontroller 1310 to the effect that the cooling fan 1306 is actually working when activated.

FIG. 14

Following activation of current tab 404, a graphical user interface 1401 is displayed on the touch sensitive display 104 allowing attributes of the currently playing music to be modified. Thus, an interface displays a volume indicator 1402 within a volume slider 1403. In response to a manual 20 interaction, it is possible to increase the output volume by the movement of slider 1402 in the direction of arrow 1404.

FIG. 15

Figure 14:
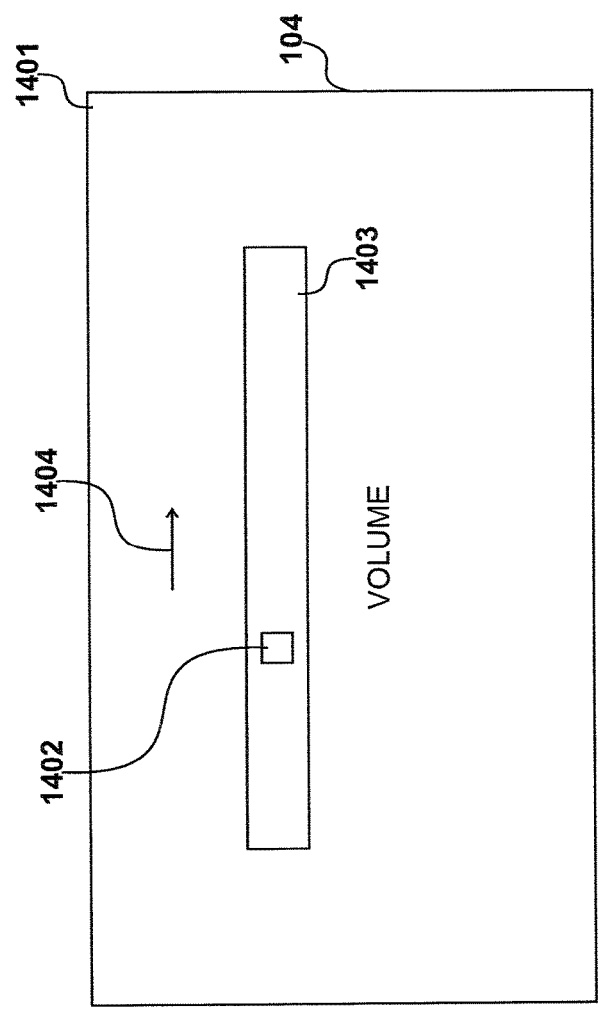
FIG. 14 shows a graphical user interface for controlling volume.
Figure 15:
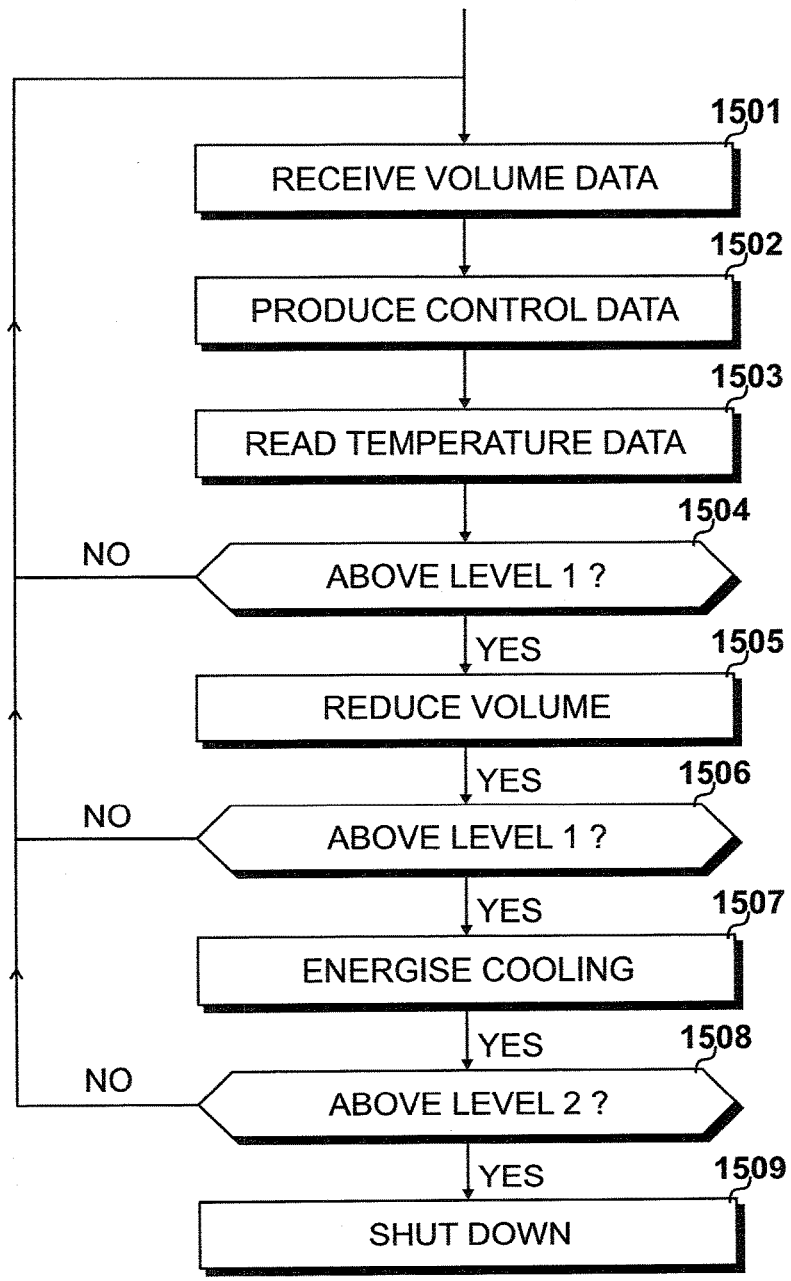
FIG. 15 shows operations performed by a microprocessor when influence by temperature.

Operations performed by microprocessor 203, when influenced by temperature, are illustrated in FIG. 15. Volume data is received at step 1501 in response to detecting a user interaction with the interface illustrated in FIG. 14. The volume input data is processed to produce control data for attenuation. Thus, control data is produced at step 1502 that is used to control the level of amplification provided by the amplifier.

Devices 1308 and 1309, along with microcontroller 1307, continue to detect the temperature of the power amplifier; with similar devices identifying temperature within other components. Microcontroller 1307 is configured to monitor temperature and to buffer a temperature measurement. In this way, the microprocessor 203 can interrogate the microcontrollers 1307, 1310 to allow the temperature data to be read at step 1503. The microprocessor 203 is then in a position to produce alternative control data to reduce the level of amplification if the temperature of the amplifier exceeds a first predetermined level. Thus, at step 1504 a question is asked as to whether the temperature is above a first level which, in an embodiment, may be seventy degrees Celsius (70° C.). If answered in the negative, no further action is required and the system remains receptive to receiving further volume data.

If the question asked at step 1504 is answered in the affirmative, to the effect that the temperature of the apparatus is too high, the volume of the amplifier is reduced at step 1505. As previously described, in an embodiment this involves providing an alternative control signal to the preamplifier, so as to reduce the gain (attenuate) by twelve decibel (12 dB).

After an appropriate delay, a question is asked at step 1506 as to whether the temperature is still above the first level of seventy degrees Celsius (70° C.). Thus, if the question asked at step 1506 is answered in the affirmative, the temperature level is continuing to be high, even after the volume has been reduced at step 1505. Under these conditions, in an embodiment, a request is made to microcontroller 1310 to energize the cooling fan 1306; assuming that the cooling fan has not already been energized in response to temperature measurements made locally. Furthermore, in an embodiment, it is possible for the cooling fan to provide different levels of cooling and a level of cooling will be provided that is consistent with the highest requirement of any of the individual temperature detectors.

After cooling has been energized at step 1507, a question is asked at step 1508 as to whether the temperature has continued to rise and is now above a second level which, in an embodiment, is set at eighty degrees Celsius (80° C.). Thus, if temperature has been restrained and the question asked at step 1508 is answered in the negative, no further action is taken and the system will operate at a reduced output level; possibly with forced cooling. However, if the temperature has risen above eighty degrees Celsius (80° C.), a complete shutdown is forced at step 1509 by the activation of relay 1305.

FIG. 16

Figure 16:
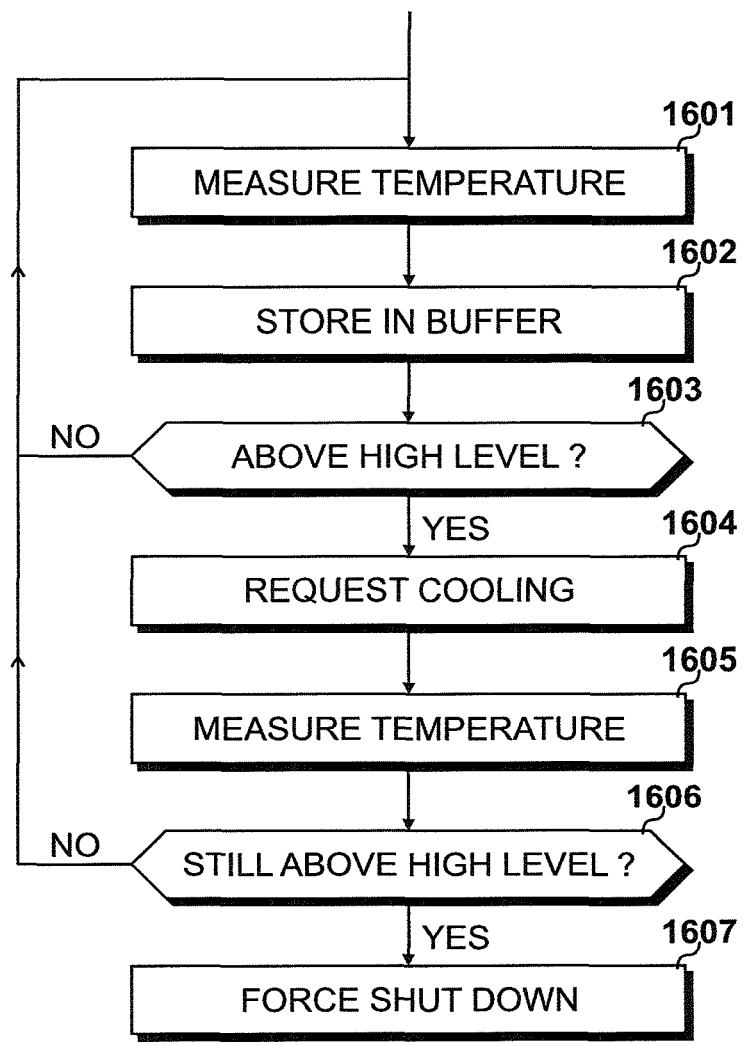
FIG. 16 shows operations performed by a micro controller.

Operations performed by microcontroller 1307 are illustrated in FIG. 16. At step 1601 a temperature measurement is made, so as to record temperature from the first temperature measuring device 1308 and the second temperature measuring device 1309. These temperatures, or at least the highest temperature of the two, are stored in a buffer at step 1602.

A question is asked at step 1603 as to whether the temperature is above a high level. In this embodiment, the microcontroller 1307 allows the microprocessor 203 to retain control when the temperature exceeds the first threshold of seventy degrees Celsius (70° C.) but will take local action if the temperature exceeds the higher threshold of ninety degrees Celsius (90° C.). Thus, if a high temperature level is detected at step 1603, a local request for cooling is made at step 1604.

At step 1605 the temperature is again measured after an appropriate delay and a question is again asked at step 1606 as to whether the temperature is above the high level. If answered in the negative, the active cooling will have been effective and operation of the system may be maintained. However, if the question asked at step 1606 is answered in the affirmative, to the effect that the temperature is still too high, a local shutdown will be forced at step 1607.

It can therefore be appreciated that many systems for regulating temperature are present within an embodiment, such that if one of the system (such as a the main microprocessor) becomes undermined, other distributed systems (such as microcontroller 1307) will take action to cool the system and will ultimately shutdown the system before it can enter a situation in which it becomes dangerous.

Collectively, there is provided in an embodiment a home entertainment amplifier with input ports for a vinyl record player, a preamplifier and a heat dissipating power amplifier having output ports for loudspeakers. A graphical user interface is provided for selecting volume. Thus, the input controls are similar to those provided on sophisticated mobile devices but the level and quality of the audio output is similar to that provided by powerful high fidelity audio systems. The closed nature of modern audio equipment with tactile control, brought together with relatively high powered amplifiers generating heat, creates difficulties in terms of heat dissipation. Consequently, in an embodiment, temperature control devices are provided for reducing the volume of the amplifier if an operational temperature is detected as being too high.

In an alternative embodiment, a monitoring device is associated with a power supply unit and a separate monitoring device is associated with the power amplifier. In this embodiment, the device on the power amplifier is responsible for power control within the power amplifier and operates autonomously from the device in the power supply unit. The device in the power supply unit contains circuitry to drive the fan and the device in the power amplifier makes cooling requests to the power supply unit device using a one wire serial bus.

In an alternative embodiment, the main microprocessor reduces the output from the volume ladder by twelve decibel (12 dB) based on temperature sensed by the microcontroller. In this embodiment, if a user adjusts the volume to a maximum level, they actually get minus twelve decibel (−12 dB). If the user adjusts the volume to minus twenty decibel (−20 dB) the actual volume will be minus thirty-two decibel (−32 dB). This may be achieved by the main microprocessor adjusting the volume ladder. Furthermore, in an embodiment, once this state has been applied (enforcing minus twelve decibel (−12 dB) of attenuation) it remains in force until two conditions are satisfied: namely, that the temperature is below a particular threshold (possibly fifty-seven degrees Celsius (57° C.)); and the user takes the volume down to the zero level and then back up. By adopting this procedure, any unexpected jumps in volume are avoided when the minus twelve decibel (−12 dB) adjustment is removed. This volume adjustment is achieved by the main microprocessor and the microcontroller on the power supply adjusts fan speed and power control.

FIG. 17

An embodiment of the invention provides for an apparatus for digitally recording an analog audio signal derived from a commercial album, in which the album has a plurality of tracks. An analog to digital converter 215 digitizes the analog audio signal and a digital storage device 206 stores the digital output from the digital to analog converter. A processing device 203 analyses the digital output to identify individual tracks and writes individual digitized tracks to digital storage.

The processing device 203 is configured to produce a plurality of digitized segments; obtain one or more track-titles from a remote audio finger-printing service; request an album title for each album on which an obtained track appears to provide candidate albums; generate a score for each provided candidate album based on the number of obtained tracks that appear on each said candidate album; identify an album from said scores; and store the digital output as individual tracks with reference to the identified album.

The embodiment illustrated in FIG. 1 shows a record deck for playing a commercial album in the form of a vinyl record, such that the analog audio signal is generated by a phonographic cartridge. As shown in the embodiment of FIG. 2, the apparatus includes a phonographic input circuit 209 and a preamplifier, such that the input circuit supplies the analog audio signal to the preamplifier 207.

Selectable components are provided within the phonographic input stage 209 that are selected to match characteristics of the phonographic cartridge in response to control signals from the processing device 203. Thus, in an embodiment, the control signals are generated in response to commands received via a graphical user interface presented on touch screen 104.

An embodiment of the invention also includes temperature detection devices for identifying high temperature conditions to the processing device 203. The processing device is configured to reduce an output level from the preamplifier in response to these high temperature conditions.

In order to obtain track-titles, an embodiment includes down sampling devices for reducing the sample rate of the digitized segments, along with truncating devices for reducing the bit depth of the digitized segments. The apparatus also includes a network connection device 218 for obtaining track-titles from an internal server. The processing device 203 is also configured to download album related artwork for the identified album via the network connection 218.

Figure 17:
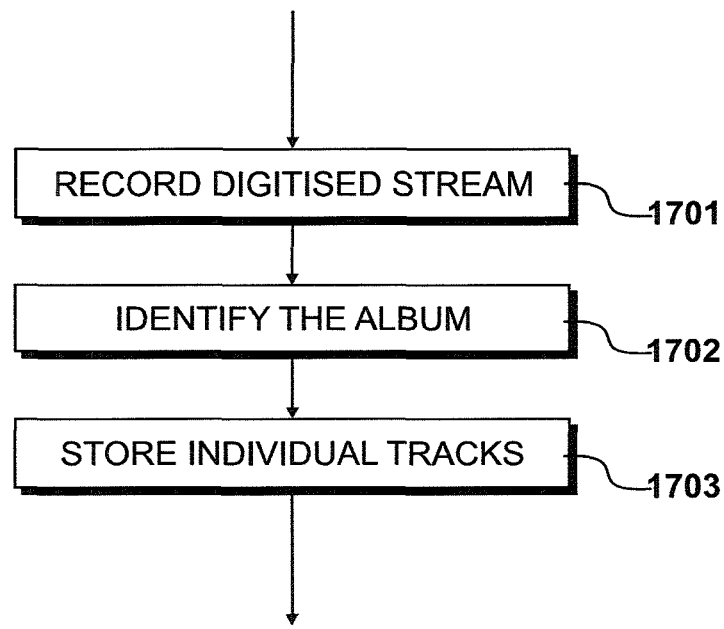
FIG. 17 shows an overview of procedures implemented by the microprocessor to identify a commercial album.

An overview of procedures implemented by the microprocessor 203 for identifying a commercial album of analog recordings is shown in FIG. 17. The album has a plurality of recorded tracks. The analog recording is played to produce an analog audio input signal and the analog audio input signal is digitized and recorded at step 1701, as detailed in FIG. 18.

At step 1702 the album is identified, as detailed with reference to FIGS. 19 to 22. The audio signal is digitally sampled to provide a plurality of digitized segments. One or more track-titles are obtained from a remote audio finger-printing service for each digitized segment, giving a plurality of obtained track-titles. For each of these obtained track-titles, an album title upon which the track appears is also requested to provide a candidate album. Thus, in an embodiment, several segments are derived from each track and an album is provided for each track identified. Several albums may be identified in this way and an actual album is selected based on a score for each album. Furthermore, by obtaining data for several segments, erroneous track identifications will tend not to result in the accruing of album candidate scores, such that the erroneous data is suppressed by more likely candidate album identifications. This process continues until only one album fits the available data; which then becomes the identified album.

During this process, a preferred candidate is identified and put forward as the identified album. This may result in artwork being displayed on the screen 104 during an initial phase of the process, which is then replaced with a better selection, more relevant to the actual artwork itself, after a greater volume of data has been considered.

Thus, for each obtained track-title, an album title upon which the obtained track-title appears is also requested, to provide the candidate albums. A score for each provided candidate album is generated based on the number of obtained track-titles that appear on a candidate album in the correct location. The album is then identified by comparing these scores.

Having identified the album at step 1702, individual tracks are stored within an appropriate container at step 1703. Similarly, for alternative operating systems, the individual files may be referenced as recorded to a particular folder or subdirectory.

FIG. 18

Figure 18:
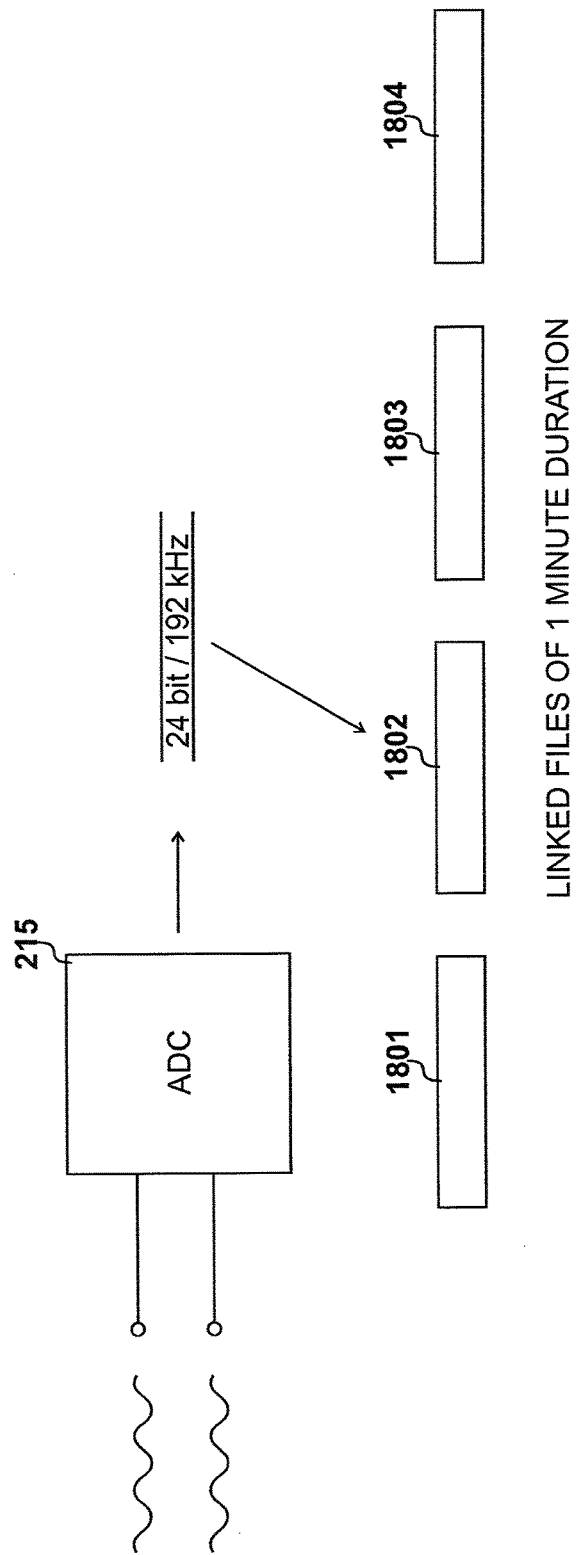
FIG. 18 shows procedures for recording digitized audio data.

Procedures for recording an incoming digitized stream of audio data are illustrated in FIG. 18. Analog data from the preamplifier 207 are supplied to the analog to digital converter 215. Each channel is sampled at one hundred and ninety two kilo-hertz (192 kHz) and twenty four (24) bits are allocated for each sample point, to record the information using pulse code modulation (PCM). The PCM data is written to the storage device 206 in this raw form without undergoing any degree of compression.

The recording process may be initiated as soon as a particular input has been selected, such as the phonographic input or, alternatively, the recording process may be initiated in response to the positive selection of a recording operation. As soon as the recording process is initiated, the data is assembled into a file of one minute duration. This file 1801 is then written to storage device 206 and the creation of a second linked file 1802 is initiated. Thus, as the recording process continues, in this embodiment, individual linked files of one minute duration are written to the storage device 206. This approach facilitates file management but, from a logical perspective, the linked files 1801, 1802, 1803, 1804 etc. effectively define a unified recording and the divisions between the files are purely time based and do not reflect the nature of the audio content.

FIG. 19

In an embodiment, the system can be set up such that recording is initiated as soon as a particular input has been selected. A vinyl record can be played and relevant artwork will be displayed on screen 104. Furthermore, the artwork is added to the media list identifying everything that has been played during a particular session.

A session closes by selecting a different input or by all of the tracks on an album being identified. The system will then break up the recording into its constituent tracks and write details to a database, along with the identified artwork.

When identifying data, a silence detector detects that input data is present and this data continues to be recorded in the one minute files shown in FIG. 18. Six point five second (6.5 s) segments are packaged up and sent to an audio fingerprinting service, such as that provided by Gracenote. The Gracenote server responds and a first process determines whether any errors are present, such that erroneous data may be rejected.

Figure 19:
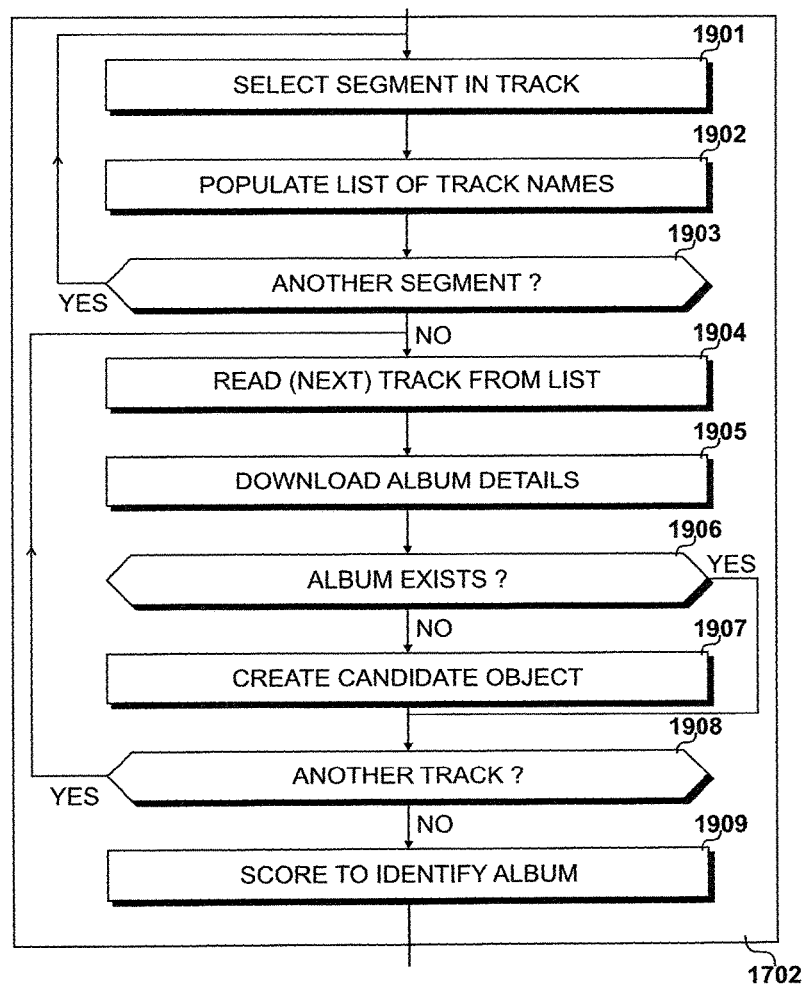
FIG. 19 shows procedures for identifying an album.

Procedures performed by the system, under control of the microprocessor 203, are shown in FIG. 19. At step 1901 a segment in a track is selected. For this track, a list is created and the list is populated with potential track names. To improve accuracy, several segments are selected and potential names are identified for each of these segments. Thus, at step 1903 a question is asked as to whether another segment is to be considered and when answered in the affirmative, a further segment of the track is selected at step 1901. Thus, the list continues to be populated at step 1902 such that, having considered, say, three segments, the list populated at step 1902 is likely to contain a plurality of potential names for the track.

At step 1904 the first track name is read from the list populated at step 1902. An album is playing on the turntable 102 therefore the track does belong to a particular album. The system is required to accurately identify the album exclusively from the audio data that is being captured. A further enquiry is made to the Gracenote server so as to identify a candidate album on which the track read at step 1904 appears. Thus, for a particular track, the track may have appeared on an initial album, on re-releases with bonus tracks and on compilations etc. The procedure aims to identify the correct album title from such possibilities.

At step 1906 a question is asked as to whether this album (details downloaded at step 1905) already exists as a candidate; having been identified on a previously iteration. If the question asked at step 1906 is answered in the negative, a new candidate object for the album is created at step 1907.

At step 1908 a question is asked as to whether another track is present on the list populated at step 1902 and when answered in the affirmative, the next track is read at step 1904. Eventually, all of the tracks will have been considered and the question asked at step 1908 will be answered in the negative. Thereafter, scores are generated for each candidate album in order to identify a specific album.

FIG. 20

Figure 20:
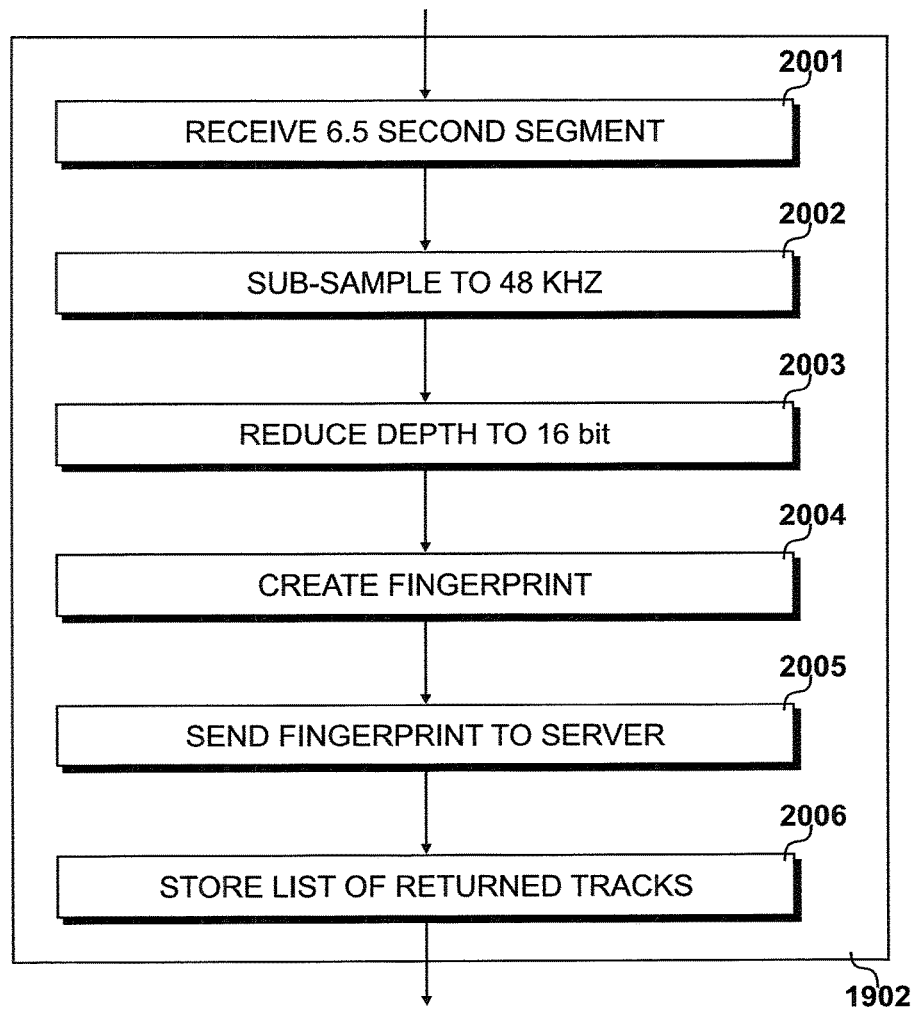
FIG. 20 details procedures for populating a list of track names.

Procedure 1902 for populating the list of track names is detailed in FIG. 20. At step 2001 a six point five second (6.5 s) segment of the track under consideration is received. The data has been sampled at one hundred and ninety two kilo-hertz (192 kHz) therefore a sub sampling procedure is performed at step 2002 to produce samples at forty-eight kilo-hertz (48 kHz). Initially, all samples will have contained twenty four bits. The bit depth is therefore reduced at step 2003 to produce a bit depth of sixteen bits.

At step 2004 a call is made to a library routine, licensed from the fingerprinting service, in order to create a finger-print which is then sent to the provider's server at step 2005. In response to this request, one or more potential tracks are returned and these are stored in a list at step 2006.

The list of track names continues to be populated with further iterations of steps 1901 to 1903. As previously described, individual items are then read from this list at step 1904.

FIG. 21

Figure 21:
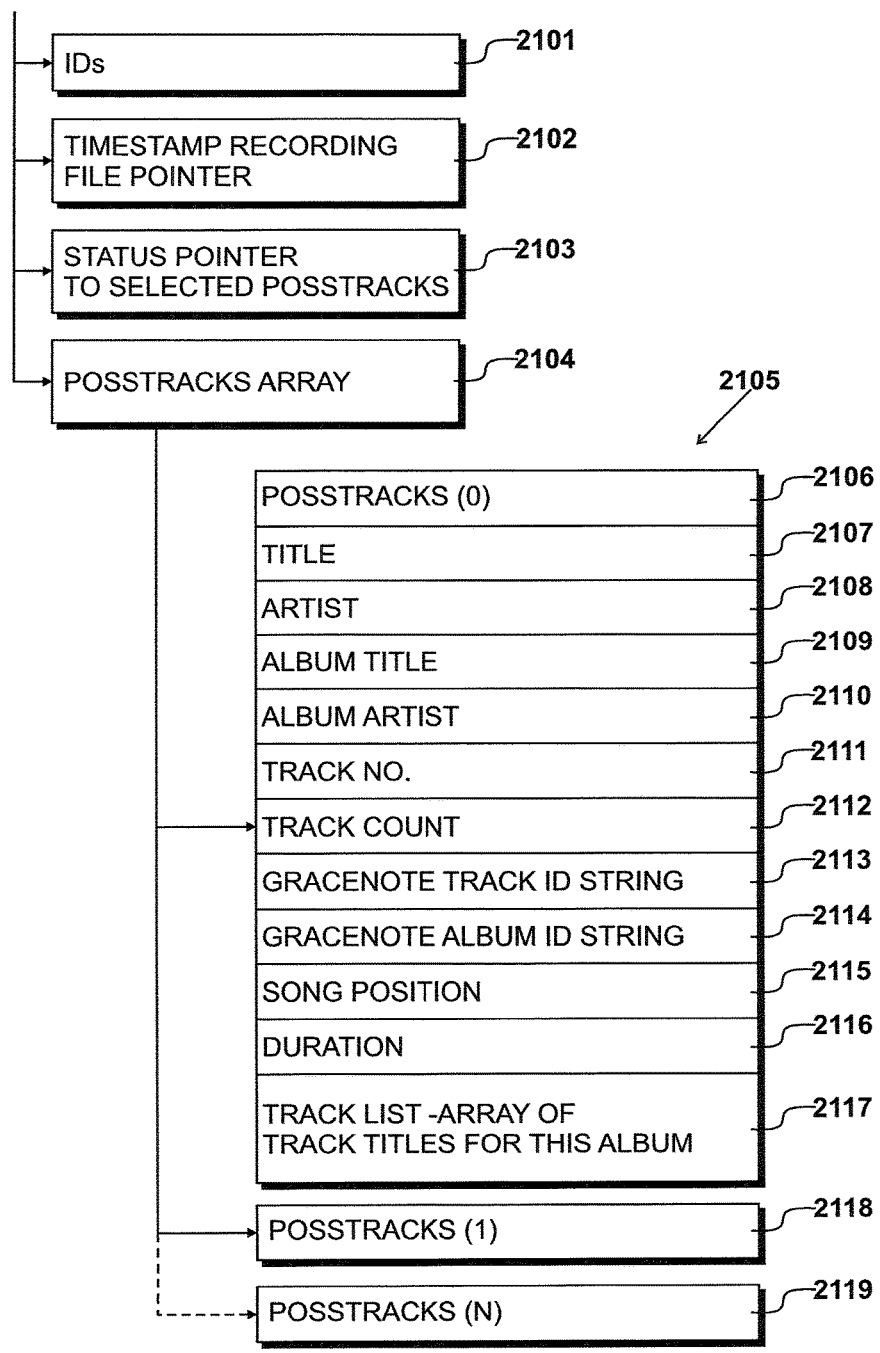
FIG. 21 illustrates a data structure.

A data structure for the data generated in response to the operation of the procedures shown in FIG. 19 is detailed in FIG. 21. For database purposes, a track under consideration is given a unique identification at 2101. To locate the track within the digitized files shown in FIG. 18, a timestamp and a file pointer are recorded at 2102. The timestamp represents the time at which the finger-print was started and the file pointer is a pointer to where the finger-prints started in the raw recorded one minute audio files.

A status pointer is recorded at 2103, representing the status of the track object. This represents the stage of processing and which album, if any, is considered as the one on which the track appears. In addition, there is a second pointer to the entry in the array as to which is currently selected as the most likely track. An array of possible tracks is recorded at 2104; consisting of a plurality of objects, including object 2105, for each potential track.

To be unique, a track does not only refer to a specific audio recording as such. The uniqueness of the track is also defined in terms of the actual album on which it appears along with its position on that album. Thus, although two recordings may be derived from exactly the same source, but with one instance on an original album and a second instance on a compilation, these instantiations will be treated as having different unique identifications; making reference not only to the track name but to the location of the track on a particular album. Thus, this assessment can only be made after all of the tracks of an album have been considered and the session has closed or until, from a logical perspective, only one of the available candidates presents itself as being consistent with all of the information collected so far.

The status pointer 2103 points to the possible track object that is currently considered to be the most likely candidate for uniquely identifying the track.

Each object has a possible track name 2106 followed by a title 2107, an artist 2108, an album title 2109 and an album artist 2110. When the album has been identified, this information may be used to populate databases within the system.

At 2111, a track number is stored and this information is used to check that the correct correlation has been made between the track and the album upon which it appears. Thus, to identify the unique album being played, not only is a track identification required but the track must occupy the correct location within the album. At 2112, data is stored identifying the total number of tracks on the suggested album.

To facilitate further look ups to the fingerprinting service, a unique track ID string is recorded at 2113, followed by a similar unique identification string for the album at 2114. A song position is stored at 2115, representing the time point in the track from which a finger-print was derived to make the match. At location 2117, a list is created of all of the track titles that appear on the album, suggested and identified at location 2109 of the respective object.

FIG. 22

Figure 22:
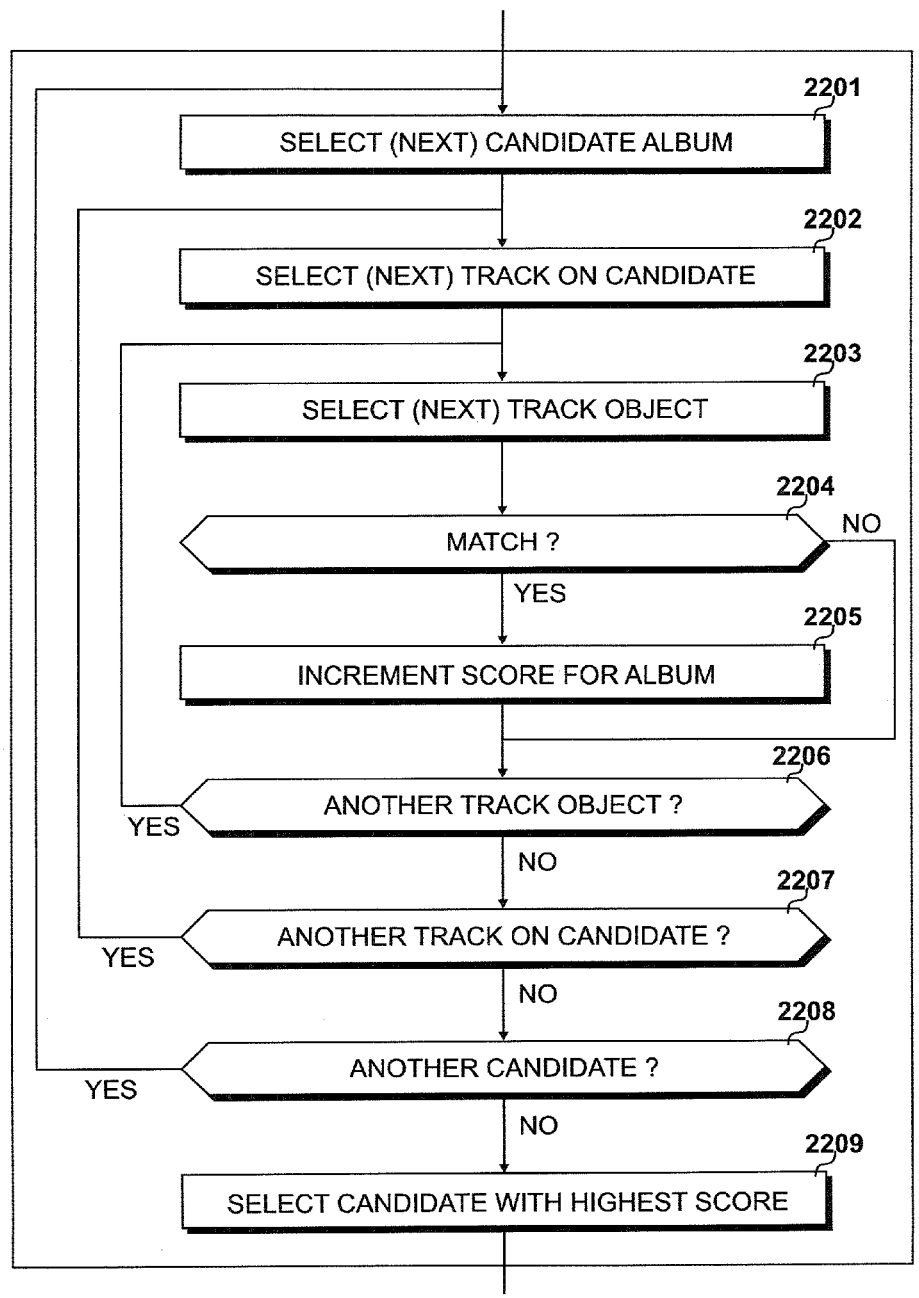
FIG. 22 shows procedures for identifying an album from calculated scores.

Procedures 1912 for identifying an album by scoring are detailed in FIG. 22. In FIG. 21, each possible track object 2105 relates to a specific suggested track appearing on a candidate album, with the album identified at location 2109. These entries therefore identify candidate album and at step 2201 a first candidate album is selected.

Within the same object (2105), list 2117 identifies all of the tracks that appear on the candidate album, including the specific track that was identified to suggest the album in the first place. Thus, at step 2202 the first track on this list for the candidate album is selected.

The track selected from the list is now compared against the other track objects. Consequently, a first track object is selected at step 2203 and a question is then asked at step 2204 as to whether there is a match. If a match does exist, a score for the candidate album is incremented at step 2205. Alternatively, if the question asked at step 2204 is answered in the negative, control passes to step 2206.

At step 2206, a question is asked as to whether a further track object is present and when answered in the affirmative, the next track object is selected at step 2203. Again, a question is asked at step 2204 as to whether a match exists and in response to this question, this score for the album may be incremented at step 2205. Thus, this process continues until all of the track objects have been considered and the question asked at step 2206 is answered in the negative.

At step 2207, a question is asked as to whether another track is present on the candidate album, selected from the track list 2117. When answered in the affirmative, the next track on the candidate album is selected at step 2202 and the matching process is repeated with respect to all of the track objects. Eventually, all of the tracks on the candidate album will have been considered and the question asked at step 2207 will be answered in the negative.

At step 2208, a question is asked as to whether another candidate is present (as detailed by location 2109 of the next object 2118), and when answered in the affirmative, the next candidate album is selected at step 2201. Thus, new tracks are identified and each of these new tracks is compared against all of the available track objects (2119).

Eventually, all of the candidates will have been considered and the question asked at step 2208 will be answered in the negative. By repeated operation of step 2205, the candidates will have accrued scores. Thus, at step 2209, a candidate is selected as the identified album by identifying the candidate with the highest score.

FIG. 23

Figure 23:
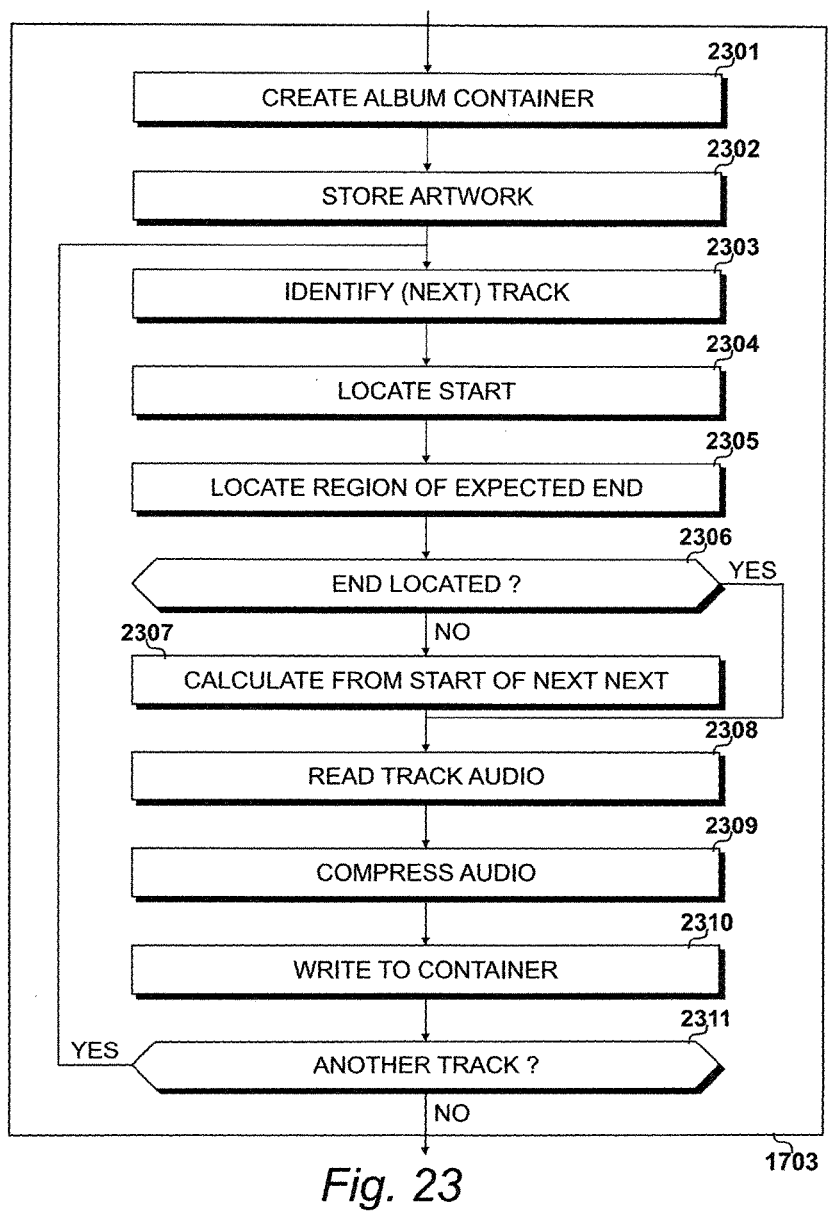
FIG. 23 shows procedures for storing individual tracks.

Procedures 1703 for storing individual tracks are detailed in FIG. 23. At step 2301, an album container is created and album artwork is stored at step 2302. For internal housekeeping purposes, entries may also be made to appropriate databases etc.

At step 2303, a first track is identified by taking the next track from the list of track objects that need to be saved. At step 2304 the start location of the track is identified, initially using song position to calculate where the start of the track is expected and then performing a degree of silence detection in order to more accurately identify the actual start of the audio material.

The identified start location can be synchronized with the start of timing data and an expected end point may be identified with reference to the data identifying the duration (of the track) at 2116. However, given that the data has been received from an analog source, it is possible that the actual duration of the recording may be shorter or longer than similar recordings derived from digital sources. Thus, when recording data of this type from a record deck of the type shown in FIG. 1, it is possible for the deck to run slightly slower than optimum speed or slightly higher than optimum speed. This difference is unlikely to affect the listening experience but it will make the duration of the recording slightly shorter or slightly longer than that expected. Thus, rather than identifying a specific ending for the track, step 2305 locates a region within which the track is expected to end. Furthermore, when recording from a source such as a record deck, this region may be made larger than when recording from a more reliable source such as a digital tape or a digital disc.

Within the region located at step 2305, operations are performed, including silence detection, to locate the actual end of the track. However, it is appreciated that when using this technique, some track endings will be more difficult to locate than others. For example, with live recordings, it is possible that audio content remains between tracks, therefore the process may actually run into the start of the next track before the end of the previous track can be determined.

A question is asked at step 2306 as to whether the actual end of the track has been located. If it was not possible to identify an end of track, the question will be answered in the negative and the end of the track will then be specified as being calculated back from the start of the next track. Thus, if it is not possible to identify a specific transition within the audio signal, representing the end of the track, the system will enforce a track ending by identifying the start point of the next track and then working backwards for a duration of, say, between two milli-seconds (2 ms) and five-hundred milli-seconds (500 ms). For the actual recorded material, it is now possible to specify a track start point and a track end point.

The track audio data is read at step 2308 and a degree of lossless compression is performed at step 2309, usually halving the total data volume without actually losing any information and thereby not degrading the quality of the audio data in any way. The compressed audio data is written to the container (established at step 2301) at step 2310 and a question is asked as to whether another track is present at step 2311. Thus, if the question asked at step 2311 is answered in the affirmative, the next track is located at step 2303 and the process is repeated. Eventually, all of the tracks will have been considered and the question asked at step 2311 will be answered in the negative.

FIG. 24

Figure 24:
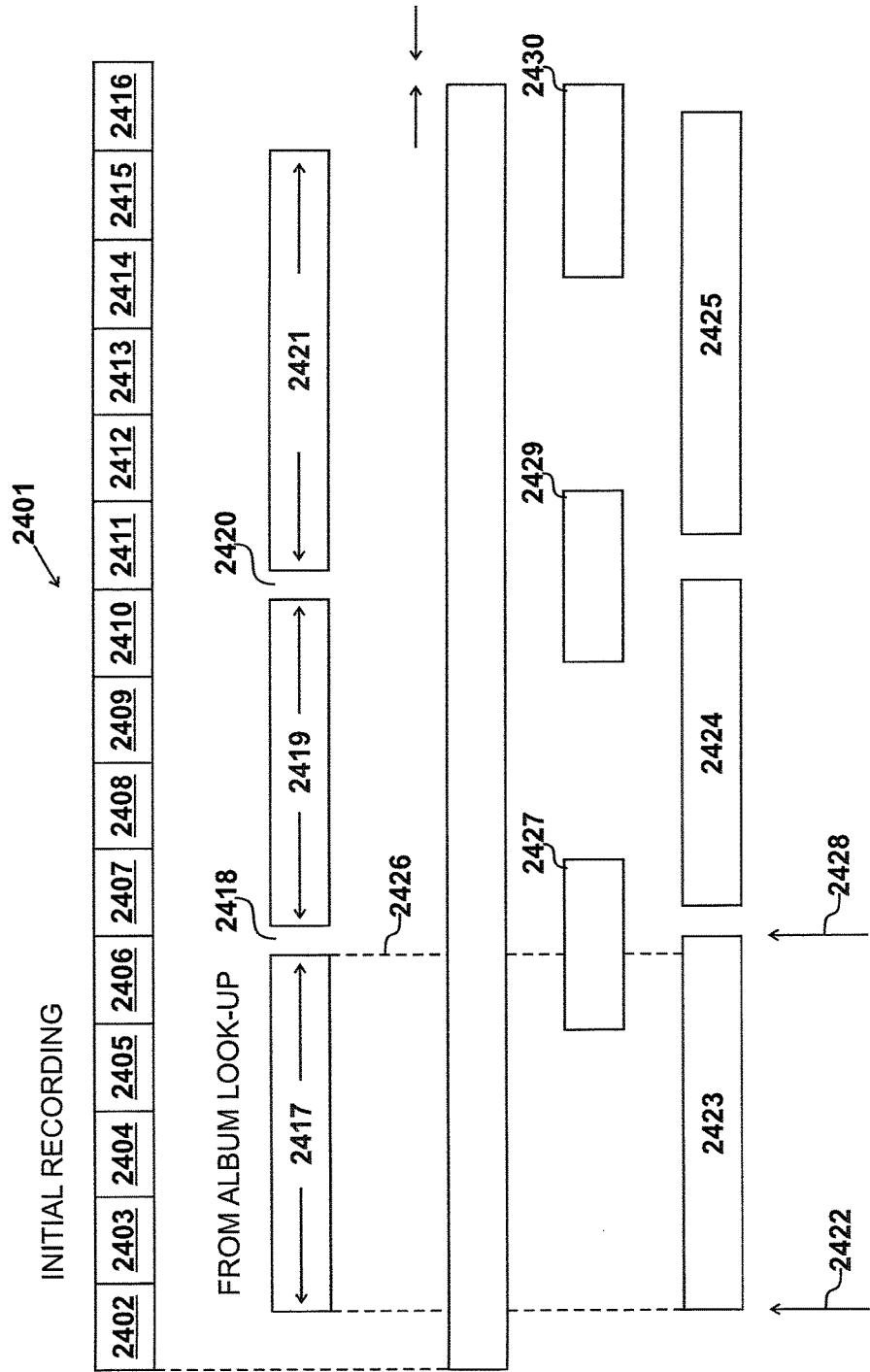
FIG. 24 illustrates operations performed by the procedures shown in FIG. 23.

An illustration of the operations performed by the process shown in FIG. 23 is illustrated in FIG. 24. An initial recording 2401 is logically continuous but for implementation reasons, it is made up of contiguous files, each having a duration of sixty seconds (60 s), of which fifteen examples are shown in FIG. 24, designated 2402 to 2416.

Information received from the external server, based on an accurate analysis of the recorded album, shows that a first track has a duration of 2417 followed by a silence 2418, a second track has a duration of 2419 followed by a silence 2420 and a third track has a duration of 2421. The start of the audio data is identified by song position and refined using the silence detection mechanism, such that the actual start, indicated by arrow 2422 of the first actual track 2423, is synchronized with the start of expected track 2417. The actual recording includes a second track 2424 and a third track 2425.

From the information downloaded, an expected end position 2426 of the first track is known, calculated from the duration of 2417. From this position, a region 2427 is located within which the actual end of recorded track 2423 is actually expected to be located. Thus, within region 2427, further investigations are performed in order to identify the actual ending of the track as illustrated by arrow 2428 which, as shown in FIG. 24, may be displaced in time with respect to the anticipated end point 2426. In this example, the actual end point has been delayed, therefore it may be assumed that the recording is running slowly and each track will actually occupy more time than expected from the data received for a true recording of the track.

To complete the session, a second region 2429 is located for the transition between the second track 2424 and a third track 2425. Similarly, a third region 2430 is located to determine the actual end point of a third track 2425.

The invention claimed is:

1. An apparatus for digitally recording an analog audio signal derived from a commercial album, in which said album has a plurality of tracks, comprising:
   an analog to digital converter for digitizing said analog audio signal;
   a digital storage device for storing a digital output signal from said analog to digital converter; and
   a processing device for analyzing said digital output signal to identify individual tracks and writing individual digitized tracks of said digital output signal to said digital storage device, wherein said processing device is configured to:
   produce a plurality of digitized segments;

obtain one or more track-titles from a remote audio finger-printing service for each digitized segment;

request an album-title for each album on which an obtained track-title appears to provide candidate albums from said remote audio finger-printing service;

generate a score for the each provided candidate album based on the number of obtained track-titles that appear on each said candidate album;

compare each track-title with the obtained track-titles wherein the respective score is incremented for each matched track title for each candidate album;

identify an album from said incremented scores, wherein the identified album has the highest incremented score from the candidate albums; and store said digital output signal as individual tracks with reference to said identified album.

2. The apparatus of claim 1, wherein said commercial album is a vinyl record and said analog audio signal is generated by a phonographic cartridge.

3. The apparatus of claim 2, including an input circuit and a pre-amplifier, wherein said input circuit supplies said analog audio signal to said pre-amplifier.

4. The apparatus of claim 3, wherein said input circuit includes selectable components that are selected to match characteristics of said phonographic cartridge in response to control signals from said processing device.

5. The apparatus of claim 4, wherein said control signals are generated in response to commands received via a graphical user interface presented on a touch screen.

6. The apparatus of claim 3, including a temperature detection device for identifying a high temperature condition to said processing device, wherein said processing device is configured to reduce an output level from the said pre-amplifier in response to said high temperature condition.

7. The apparatus of claim 2, including a down-sampling device for reducing a sample rate of said digitized segments.

8. The apparatus of claim 7, including a truncating device for reducing a bit depth of said digitized segments.

9. The apparatus of claim 1, including a network connection device for obtaining said track-titles from an external server.

10. The apparatus of claim 9, wherein said processing device is also configured to download album related artwork for the identified album via said network connection.

11. A method of identifying a commercial album of analog audio recordings, in which an album has a plurality of recorded tracks, comprising the steps of:

playing an analog recording of said album to produce an analog audio input signal;

digitally sampling said audio input signal to produce a digital output signal;

storing said digital output signal; and analyzing said digital output signal to identify individual tracks and writing individual digitized tracks of said digital output signal to a digital storage device, by further comprising the steps of:

(a) producing a plurality of digitized segments from said digital output signal;

(b) obtaining one or more track titles from a remote audio finger-printing service for each said digitized segment;

(c) requesting an album title for each album on which an obtained track title appears, to provide candidate albums from said remote audio finger-printing service;

(d) generating a score for each provided candidate album based on the number of obtained track titles that appear on each said candidate album;

(e) comparing each track title with the obtained track titles, wherein the respective score is incremented for each matched track title for each candidate album;

(f) identifying an album from said incremented scores, wherein the identified album has the highest incremented score from the candidate albums; and (g) storing said digital output signal as individual tracks with reference to said identified album.

12. The method of claim 11, wherein:

said audio signal is continually sampled and digitized at a first sampling rate to produce first digitized samples;

said first digitized samples are continually recorded; and said segment is selected from said continually recorded first digitized samples.

13. The method of claim 12, wherein the sampling rate of said first digitized samples is reduced to produce second digital samples; and said segments are derived from said second digital samples.

14. The method of claim 13, wherein a bit depth of the first digital samples is reduced to produce said second digital samples.

15. The method of claim 11, wherein said producing step (b), said obtaining step (c), said requesting step (d), said generating step (e) and said identifying step (f) are repeated if a next identified track does not have an expected track-title.

16. The method of claim 15, wherein an identified album is maintained as such and steps (b), (c), (d), (e) and (f) are not repeated if a next identified track does have a track-title that is consistent with the next track expected on the identified album.

17. The method of claim 11, wherein said audio input signal is sampled and recorded to a first recoding.

18. The method of claim 17, wherein said first recording is re-recorded as a plurality of second recordings, wherein each said second recording relates to an individual track and track boundaries are specified with respect to track durations collected with reference to the identified track.

19. The method of claim 18, further comprising the step of analyzing regions of the first recording around locations of expected track boundaries to locate actual track boundaries prior to said re-recording step.

20. The method of claim 19, wherein a track boundary is identified by identifying the start of a track; and the end of a previous track is specified as being a predetermined duration before said identified start of a track.

* * * * *